United States Patent
Yu et al.

(10) Patent No.: US 11,126,020 B2
(45) Date of Patent: Sep. 21, 2021

(54) ELECTRO-OPTICALLY ACTIVE DEVICE

(71) Applicant: ROCKLEY PHOTONICS LIMITED, Oxford (GB)

(72) Inventors: Guomin Yu, Glendora, CA (US); Yi Zhang, Pasadena, CA (US); Aaron John Zilkie, Pasadena, CA (US)

(73) Assignee: Rockley Photonics Limited, Altrincham (GB)

( * ) Notice: Subject to any disclaimer, the term of this patent is extended or adjusted under 35 U.S.C. 154(b) by 0 days.

(21) Appl. No.: 16/766,268

(22) PCT Filed: May 11, 2018

(86) PCT No.: PCT/EP2018/062269
§ 371 (c)(1),
(2) Date: May 21, 2020

(87) PCT Pub. No.: WO2019/101369
PCT Pub. Date: May 31, 2019

(65) Prior Publication Data
US 2020/0363662 A1    Nov. 19, 2020

Related U.S. Application Data

(63) Continuation-in-part of application No. PCT/EP2017/080221, filed on Nov. 23, 2017.
(Continued)

(51) Int. Cl.
*G02F 1/017* (2006.01)

(52) U.S. Cl.
CPC .... *G02F 1/01708* (2013.01); *G02F 2202/103* (2013.01); *G02F 2202/108* (2013.01)

(58) Field of Classification Search
CPC .. G02F 1/01708; G02F 2202/108; G02B 6/00
(Continued)

(56) References Cited

U.S. PATENT DOCUMENTS 5,163,118 A * 11/1992 Lorenzo ............... G02B 6/122
385/123
6,154,475 A   11/2000 Soref et al.
(Continued)

FOREIGN PATENT DOCUMENTS

GB   2573586 A   11/2019
WO   WO 2018/096038 A1   5/2018

OTHER PUBLICATIONS

Claussen, S.A. et al., "Selective area growth of germanium and germanium/silicon-germanium quantum wells in silicon waveguides for on-chip optical interconnect applications", Optical Materials Express, Oct. 1, 2012, pp. 1336-1342, vol. 2, No. 10, OSA.
(Continued)

*Primary Examiner* — Kaveh C Kianni
(74) *Attorney, Agent, or Firm* — Lewis Roca Rothgerber Christie LLP

(57) ABSTRACT

A silicon based electro-optically active device and method of producing the same. The silicon based electro-optically active device comprising: a silicon-on-insulator (SOI) waveguide; an electro-optically active waveguide including an electro-optically active stack within a cavity of the SOI waveguide; and a lined channel between the electro-optically active stack and the SOI waveguide, the lined channel comprising a liner; wherein the lined channel is filled with a filling material with a refractive index similar to that of a material forming a sidewall of the cavity, to thereby form a bridge-waveguide in the channel between the SOI waveguide and the electro-optically active stack.

27 Claims, 15 Drawing Sheets

Related U.S. Application Data

(60) Provisional application No. 62/635,955, filed on Feb. 27, 2018.

(58) Field of Classification Search
USPC .............................................................. 385/3
See application file for complete search history.

(56) References Cited

U.S. PATENT DOCUMENTS

| | | | | |
|---|---|---|---|---|
| 6,222,951 | B1* | 4/2001 | Huang | H04B 10/2587 |
| | | | | 385/14 |
| 7,257,283 | B1* | 8/2007 | Liu | G02B 6/12004 |
| | | | | 385/14 |
| 7,391,801 | B1* | 6/2008 | Soref | H01S 5/026 |
| | | | | 372/92 |
| 8,106,379 | B2* | 1/2012 | Bowers | H01L 31/0304 |
| | | | | 257/14 |
| 8,160,404 | B2 | 4/2012 | Pan et al. | |
| 8,330,242 | B2 | 12/2012 | Shiba et al. | |
| 8,710,470 | B2 | 4/2014 | Gattass et al. | |
| 8,767,792 | B2* | 7/2014 | Bowers | H01S 5/141 |
| | | | | 372/75 |
| 8,768,132 | B2 | 7/2014 | Stewart et al. | |
| 9,134,553 | B2 | 9/2015 | Lim et al. | |
| 9,209,142 | B1 | 12/2015 | Lambert et al. | |
| 9,368,579 | B2 | 6/2016 | Balram et al. | |
| 9,500,807 | B2* | 11/2016 | Oka | G02F 1/011 |
| 9,513,498 | B2 | 12/2016 | Jones et al. | |
| 9,768,195 | B2 | 9/2017 | Chou et al. | |
| 9,922,967 | B2 | 3/2018 | Krasulick | |
| 10,340,661 | B2* | 7/2019 | Caer | H01S 5/227 |
| 2002/0172464 | A1* | 11/2002 | Delwala | G02F 1/295 |
| | | | | 385/40 |
| 2003/0003734 | A1* | 1/2003 | Delwala | G02B 6/12026 |
| | | | | 438/689 |
| 2003/0003735 | A1* | 1/2003 | Deliwala | G02B 6/1225 |
| | | | | 438/689 |
| 2003/0003736 | A1* | 1/2003 | Delwala | G02B 6/1225 |
| | | | | 438/689 |
| 2003/0003737 | A1* | 1/2003 | Delwala | G02F 1/025 |
| | | | | 438/689 |
| 2003/0003738 | A1* | 1/2003 | Delwala | G02B 6/12011 |
| | | | | 438/689 |
| 2004/0069984 | A1* | 4/2004 | Estes | G02B 6/4201 |
| | | | | 257/25 |
| 2004/0207016 | A1* | 10/2004 | Patel | H01L 27/14636 |
| | | | | 257/347 |
| 2004/0258347 | A1* | 12/2004 | Gothoskar | G02B 6/124 |
| | | | | 385/14 |
| 2005/0189591 | A1* | 9/2005 | Gothoskar | G02F 1/025 |
| | | | | 257/347 |
| 2005/0236619 | A1* | 10/2005 | Patel | H01L 27/1443 |
| | | | | 257/57 |
| 2006/0177173 | A1* | 8/2006 | Shastri | G02F 1/025 |
| | | | | 385/14 |
| 2008/0073744 | A1* | 3/2008 | Masini | H01L 31/109 |
| | | | | 257/466 |
| 2008/0267239 | A1* | 10/2008 | Hall | H01S 5/22 |
| | | | | 372/46.013 |
| 2009/0016666 | A1* | 1/2009 | Kuo | G02B 6/12004 |
| | | | | 385/2 |
| 2009/0324164 | A1* | 12/2009 | Reshotko | G02B 6/42 |
| | | | | 385/14 |
| 2010/0247021 | A1* | 9/2010 | Cunningham | G02F 1/025 |
| | | | | 385/1 |
| 2010/0247022 | A1* | 9/2010 | Li | G02B 6/12007 |
| | | | | 385/1 |
| 2010/0247029 | A1* | 9/2010 | Li | G02F 1/0147 |
| | | | | 385/14 |
| 2010/0330727 | A1* | 12/2010 | Hill | G02F 1/025 |
| | | | | 438/69 |
| 2011/0170819 | A1 | 7/2011 | Zheng et al. | |
| 2011/0215344 | A1* | 9/2011 | Dardy | G02F 1/025 |
| | | | | 257/83 |
| 2011/0299561 | A1* | 12/2011 | Akiyama | H01S 5/02325 |
| | | | | 372/50.11 |
| 2012/0207424 | A1 | 8/2012 | Zheng et al. | |
| 2012/0207479 | A1* | 8/2012 | Krishnamoorthy | G02F 1/025 |
| | | | | 398/85 |
| 2012/0219250 | A1* | 8/2012 | Ren | G02B 6/136 |
| | | | | 385/14 |
| 2012/0300796 | A1* | 11/2012 | Sysak | H01S 5/1032 |
| | | | | 372/6 |
| 2013/0039664 | A1* | 2/2013 | Clifton | B82Y 20/00 |
| | | | | 398/200 |
| 2013/0051727 | A1* | 2/2013 | Mizrahi | G02B 6/2804 |
| | | | | 385/28 |
| 2013/0279845 | A1* | 10/2013 | Kobrinsky | G02B 6/12004 |
| | | | | 385/14 |
| 2013/0285184 | A1* | 10/2013 | Li | H01L 31/02325 |
| | | | | 257/432 |
| 2013/0321816 | A1* | 12/2013 | Dattner | G01J 3/4531 |
| | | | | 356/451 |
| 2014/0061677 | A1* | 3/2014 | Jakoby | G01N 21/7703 |
| | | | | 257/80 |
| 2014/0270618 | A1* | 9/2014 | Dinu | H01S 5/14 |
| | | | | 385/3 |
| 2014/0307997 | A1* | 10/2014 | Bar | H01L 21/8252 |
| | | | | 385/14 |
| 2014/0334768 | A1* | 11/2014 | Chang | G02B 6/4212 |
| | | | | 385/14 |
| 2015/0098676 | A1* | 4/2015 | Krasulick | H01S 5/02326 |
| | | | | 385/14 |
| 2015/0125111 | A1* | 5/2015 | Orcutt | G02F 1/025 |
| | | | | 385/14 |
| 2015/0270684 | A1* | 9/2015 | Suzuki | H01S 5/1237 |
| | | | | 372/45.012 |
| 2016/0043262 | A1* | 2/2016 | Okumura | H01L 31/028 |
| | | | | 257/184 |
| 2016/0087160 | A1 | 3/2016 | Cheng et al. | |
| 2016/0109731 | A1* | 4/2016 | Huang | G02F 1/025 |
| | | | | 385/3 |
| 2016/0111407 | A1 | 4/2016 | Krasulick | |
| 2016/0211645 | A1* | 7/2016 | Padullaparthi | H01S 5/02251 |
| 2016/0246016 | A1 | 8/2016 | Mizrahi et al. | |
| 2016/0358954 | A1* | 12/2016 | Hoyos | H01L 29/945 |
| 2017/0207600 | A1* | 7/2017 | Klamkin | H01S 5/142 |
| 2017/0229840 | A1* | 8/2017 | Lambert | G02B 6/122 |
| 2017/0255077 | A1* | 9/2017 | Pruessner | G01S 7/4813 |
| 2017/0317471 | A1* | 11/2017 | Lor | G02B 6/124 |
| 2018/0019139 | A1 | 1/2018 | Sun et al. | |
| 2018/0081118 | A1* | 3/2018 | Klamkin | G02B 6/4208 |
| 2018/0246351 | A1* | 8/2018 | Ho | G02F 1/01708 |
| 2019/0140425 | A1* | 5/2019 | Hahn | H01S 5/0424 |
| 2019/0179177 | A1* | 6/2019 | Rickman | G02F 1/025 |
| 2019/0377203 | A1 | 12/2019 | Yu et al. | |
| 2019/0384003 | A1* | 12/2019 | Painchaud | G02B 6/2821 |
| 2019/0384073 | A1 | 12/2019 | Yu et al. | |
| 2020/0124878 | A1* | 4/2020 | Yu | H01L 27/30 |

OTHER PUBLICATIONS

International Search Report and Written Opinion of the International Searching Authority, dated Mar. 8, 2018, Corresponding to PCT/EP2017/080221, 13 pages.

International Search Report and Written Opinion of the International Searching Authority, dated Aug. 29, 2018, Corresponding to PCT/EP2018/062269, 15 pages.

Ren, Shen, "Ge/SiGe Quantum Well Waveguide Modulator for Optical Interconnect Systems", Dissertation submitted to the department of electrical engineering and the committee on graduate studies of Stanford University in partial fulfillment of the requirements for the degree of doctor of philosophy, Mar. 2011, 138 pages.

Ren, Shen et al., "Selective epitaxial growth of Ge/$Si_{0.15}Ge_{0.85}$ quantum wells on Si substrate using reduced pressure chemical vapor deposition", Applied Physics Letters, 2011, pp. 151108-1 through 151108-3, American Institute of Physics.

(56) References Cited

OTHER PUBLICATIONS

Rouifed, Mohamed-Saïd et al., "Advances Toward Ge/SiGe Quantum-Well Waveguide Modulators at 1.3μm", IEEE Journal of Selected Topics in Quantum Electronics, 2013, 7 pages, vol. 20, No. 4, IEEE.

U.K. Intellectual Property Office Combined Search and Examination Report, dated Sep. 27, 2018, for Patent Application No. GB1812309.1, 5 pages.

U.K. Intellectual Property Office Combined Search and Examination Report, dated Sep. 27, 2018 and re-sent by Examiner Sep. 26, 2019, for Patent Application No. GB1812309.1, 7 pages.

U.S. Office Action for U.S. Appl. No. 16/427,247, dated Apr. 15, 2020, 14 pages.

U.S. Office Action for U.S. Appl. No. 16/463,203, dated Apr. 16, 2020, 13 pages.

U.S. Notice of Allowance from U.S. Appl. No. 16/463,203, dated Aug. 31, 2020, 8 pages.

International Search Report and Written Opinion of the International Searching Authority issued in PCT/IB2019/000565, dated Sep. 17, 2019, 13 pages.

U.K. Intellectual Property Office Combined Search and Examination Report, dated Feb. 17, 2020, for Patent Application No. GB1912499.9, 5 pages.

Unpublished U.S. Appl. No. 17/055,541, filed Nov. 13, 2020.

\* cited by examiner

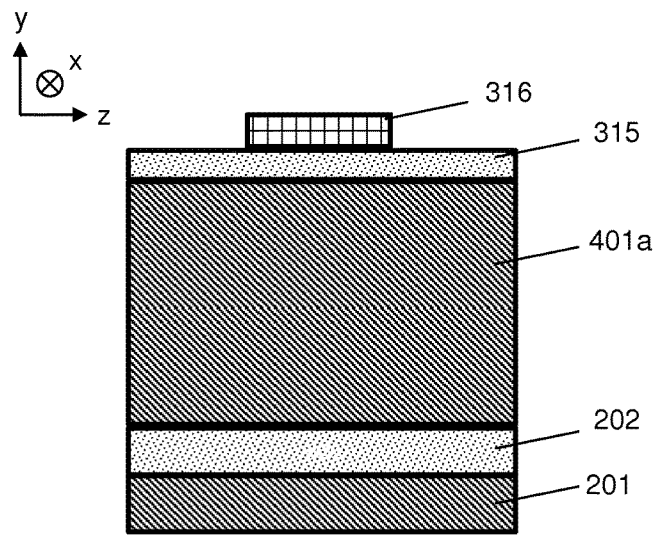
Fig. 3(N)A
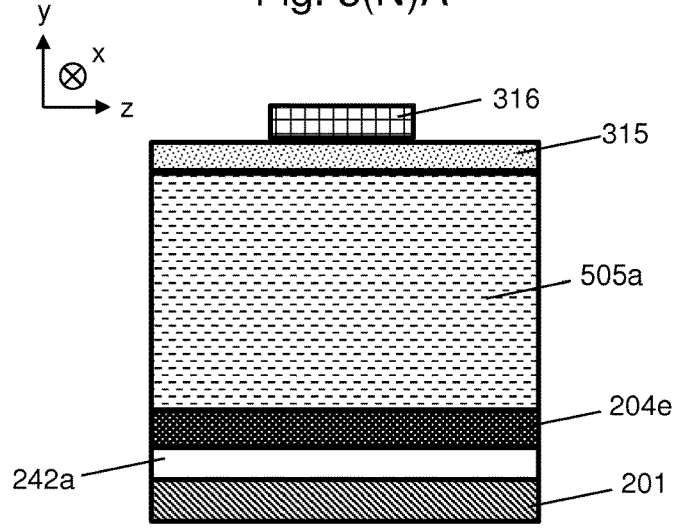
Fig. 3(N)B
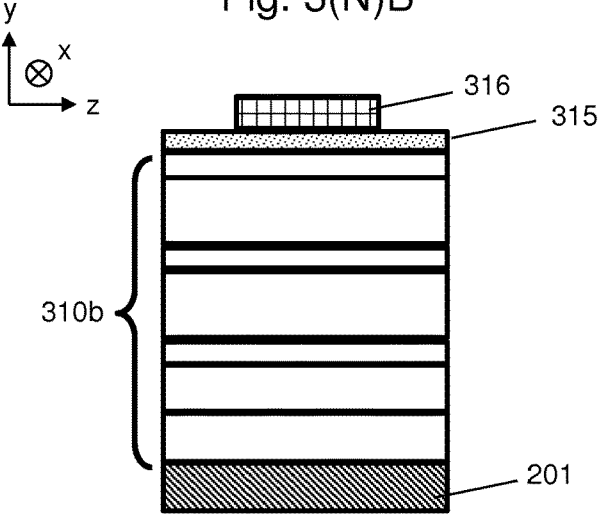
Fig. 3(N)C

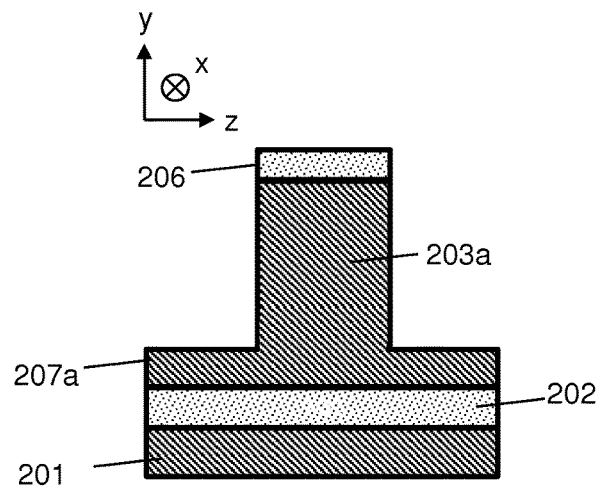
Fig. 3(O)A
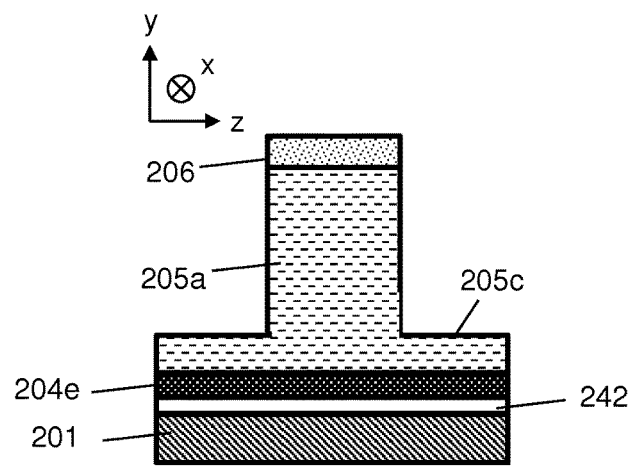
Fig. 3(O)B
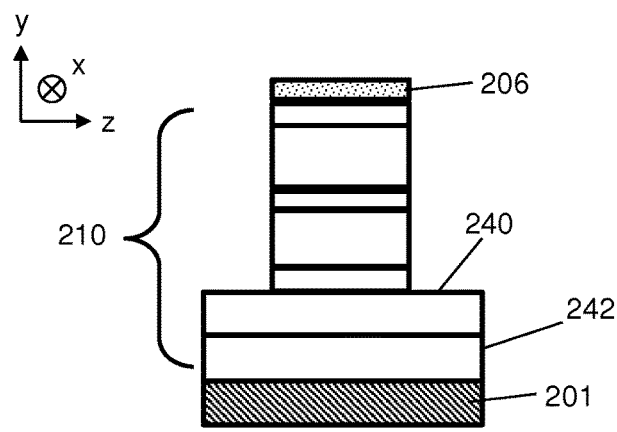
Fig. 3(O)C

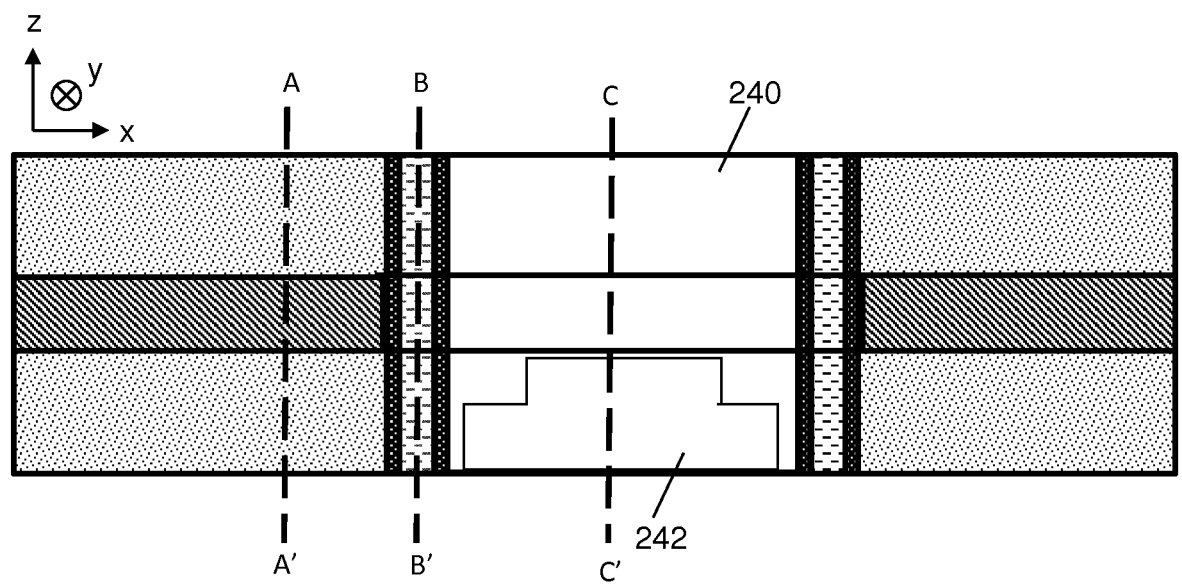
Fig. 3(P)
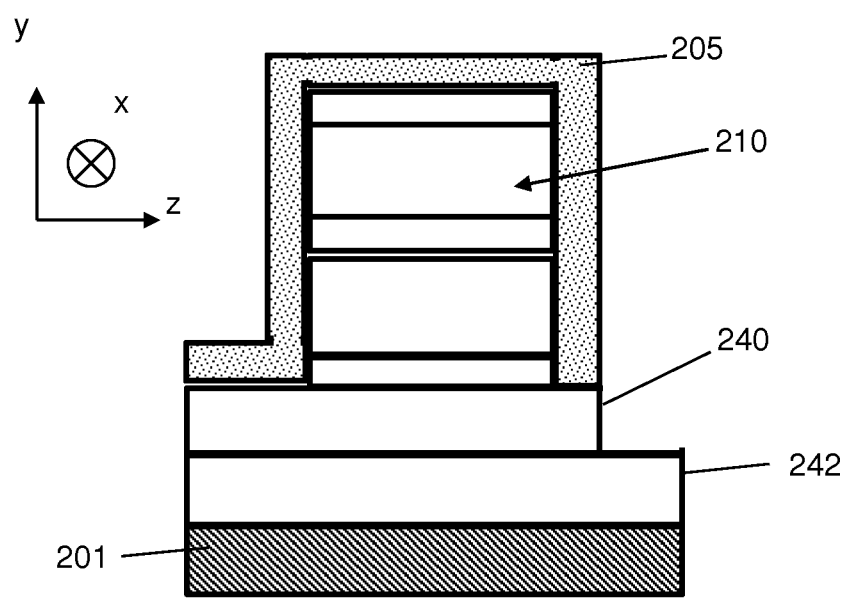
Fig. 3(P)A

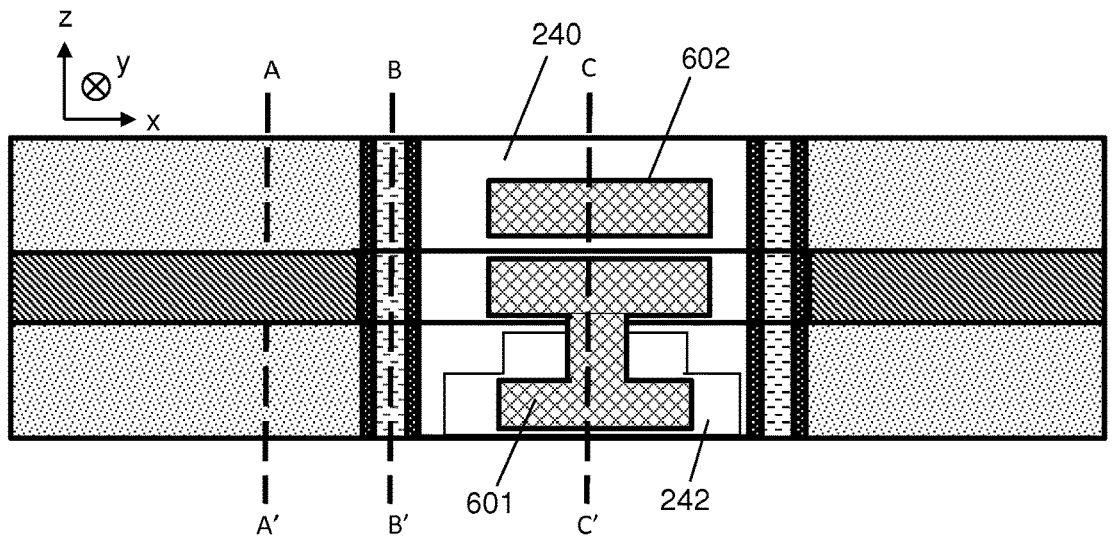
Fig. 3(Q)
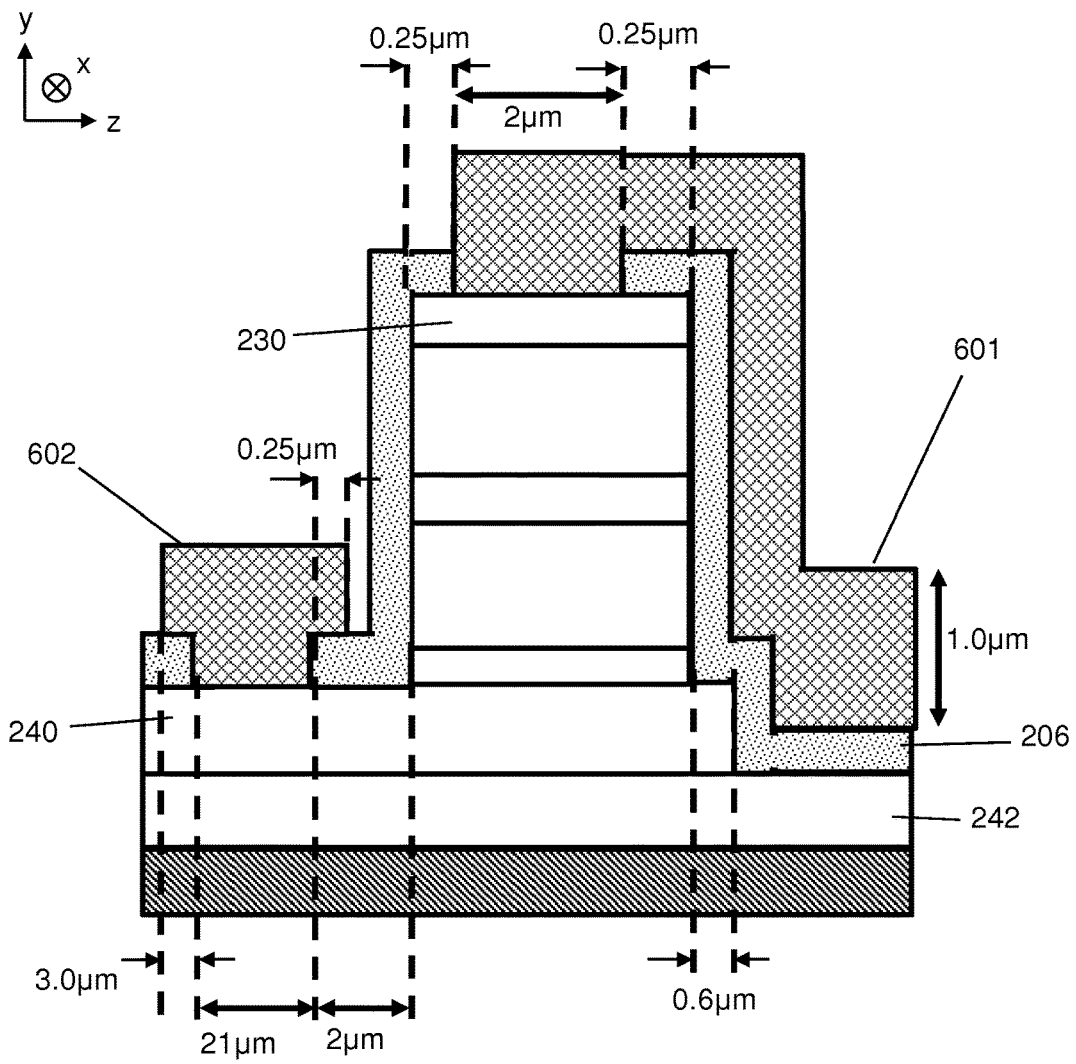
Fig. 3(Q)A

ELECTRO-OPTICALLY ACTIVE DEVICE

CROSS-REFERENCE TO RELATED APPLICATION(S)

This application is a national stage entry, under 35 U.S.C. § 371, of International Application Number PCT/EP2018/062269, filed on May 11, 2018, which claims priority to International Patent Application Number PCT/EP2017/080221, filed Nov. 23, 2017, and which claims priority to and the benefit of U.S. Provisional Patent Application No. 62/635,955, filed Feb. 27, 2018. The entire contents of all of the applications identified in this paragraph are incorporated herein by reference.

FIELD OF THE INVENTION

The present invention relates to silicon based electro-optically active devices, and particularly to electro-optic modulators.

BACKGROUND

As shown in FIG. 1, conventional electro-optically active devices may comprise an SOI substrate 101, on which is formed first and second passive waveguides 102a and 102b. An electro-optically active EPI stack 103 is grown in a gap between the passive waveguides, and may include first and second faceted or bending regions 104a 104b.

These faceted or bending regions of the EPI stack can produce significant losses in the device.

SUMMARY

Generally the invention provides an electro-optically active device and method of producing the same where the faceted regions are removed and replaced with a filling material.

Accordingly, in a first aspect the invention provides silicon based electro-optically active device comprising: a silicon-on-insulator, SOI waveguide; an electro-optically active waveguide including an electro-optically active stack within a cavity of the SOI waveguide; and a lined channel between the electro-optically active stack and the SOI waveguide, the lined channel comprising a liner; wherein the lined channel is filled with a filling material with a refractive index similar to that of a material forming a sidewall of the cavity, to thereby form a bridge-waveguide in the channel between the SOI waveguide and the electro-optically active stack.

In a second aspect, there is provided a method of producing a silicon based electro-optically active device, having the steps of: providing a silicon-on-insulator, SOI, waveguide; etching a cavity in a part of the SOI waveguide through a BOX layer of the SOI waveguide; epitaxially growing an electro-optically active stack within the cavity, and etching the electro-optically active stack to form an electro-optically active waveguide, wherein the epitaxially grown electro-optically active stack has a facet in a region adjacent to a sidewall of the cavity; etching the region to thereby remove the facet and produce a channel between the sidewall and the stack; lining the channel with a liner to provide a lined channel; and filling the lined channel with a filling material which has a refractive index which is similar to that of a material forming the sidewall so that the filling material forms a bridge-waveguide in the channel between the SOI waveguide and the electro-optically active stack.

By electro-optically active stack, it may be meant that the stack comprises plural functional layers some of which are electro-optically active. For example, the stack may include a buffer layer, P doped layer and an N doped layer, separated by an intermediate layer which includes spacer layers, multiple quantum well (MQW) and barrier layers. These layers may be layered relative to the SOI waveguide on which the stack is formed, i.e. they are horizontal layers. The buffer layer functions as the virtual substrate for the MQW layer, and can be either un-doped or P-doped. By similar to, it may be meant that the refractive index of the filling material is such as to provide an essentially barrierless waveguide formed of: the SOI waveguide, the liner, and the filling material. Similar may mean substantially equal to. The refractive index of the filling material may be greater than or less than that of a material forming a sidewall of the cavity. The refractive index of the filling material may be within 10% of the refractive index of a material forming a sidewall of the cavity. The refractive index of the filling material may be at least 3.2 and no more than 4.0 at a wavelength of 1310 nm. The refractive index of the material forming the sidewall of the cavity may be at least 3.4 and no more than 3.6 at a wavelength of 1310 nm. The refractive index of the liner may be at least 2.5 and no more than 2.8 at a wavelength of 1310 nm.

In this way, light couples between the SOI waveguide and the electro-optically active stack via the bridge-waveguide such that there is no direct contact between a facet of the SOI waveguide in the region adjacent the sidewall of the cavity and the sidewall of the electro-optically active stack.

Advantageously, by lining the channel with a liner there is no requirement to provide an insulator layer between the filling material and the substrate of the SOI waveguide.

Conveniently, the liner provides passivation to facets after the electro-optically active stack has been etched. When no liner is provided, facets are exposed to the atmosphere during subsequent processes (e.g. $SiO_2$ deposition, α-Silicon deposition, and $SiO_2$ etching) which can add defects to the facets. As a result, the method of the present invention can provide a higher yield as compared to prior methods.

Advantageously, the method above is easier and simpler than the prior art. In examples using no liner, the required chemical-mechanical planarization step after deposition of the insulator is very complicated.

Conveniently, the optical coupling efficiency is not diminished as compared to devices which do not contain the liner.

When viewed from the side of the device, the channel may be described as extending vertically downwards (i.e. in a direction at 90° to the surface of the SOI waveguide) from an uppermost side of the device towards the bottom of the cavity.

Optional features of the invention will now be set out. These are applicable singly or in any combination with any aspect of the invention.

The liner may be formed of silicon nitride. For example, the liner may be formed of $Si_3N_4$. The liner may have a thickness of at least 200 nm and no more than 280 nm. In some examples, the liner may have a thickness of 240 nm. In some examples, the liner has similar dimension to the remaining structure and so its height may vary when viewed in a cross-section aligned with the guiding direction of the waveguide. In other examples the liner may be formed as a substantially uniform wall having a uniform height. A lowest surface of the sidewalls of the channel and a top surface of a portion of the liner located in the base of the channel may be aligned with a top surface of a buried oxide layer of the SOI.

The filling material may be amorphous silicon (α-Si) or SiGe material. There may be a second lined channel, between the electro-optically active stack and a second SOI waveguide, the second lined channel comprising a second liner. The second lined channel may be filled with the same filling material as the first lined channel. The second lined channel may be located on an opposing side of the electro-optically active waveguide to the first lined channel.

The surface of the stack which is directed at the channel may be described as an etched surface. The etched surface will exhibit advantages over a grown-surface, in that undesirable bending region at the edges of each grown layer of the stack can be removed by etching. Instead, the interface between the stack and the channel will be sharp one; a slice through the stack. Therefore, the bending region is replaced by a filling material, which forms a straight bridge waveguide that is aligned with the SOI waveguide and the electro-optically active EPI stack.

The electro-optically active stack may have a parallelogramal or trapezoidal geometry when viewed from above (top down view).

The electro-optically active device may further comprise an epitaxial cladding layer located in-between the silicon substrate of the SOI device and the optically active region which forms the electro-optically active waveguide. The epitaxial cladding layer has a refractive index less than that of the buffer layer in the electro-optically active stack. The epitaxial layer may be referred to as a regrown cladding layer in that it may be formed by etching away a pre-existing cladding region or part of a cladding region such as a buried oxide (BOX) region and then growing the epitaxial cladding layer in the etched cavity, the epitaxial cladding layer replacing a portion of the original cladding layer.

The step of filling the channel may be carried out by plasma-enhanced chemical vapour deposition (PECVD), or low-energy plasma-enhanced chemical vapour deposition (LEPECVD), or other epitaxial growth method at a temperature less than a lowest growth temperature of the stack. The temperature may be in the range of 250° C. and 500° C. In some embodiments the temperature may be in the range of 300° C. and 350° C. The step of filling the lined channel may be carried out by hot-wire chemical vapour deposition.

The method may further include a step of planarizing the filling material through chemical-mechanical polishing.

The epitaxially grown electro-optically active stack may have a second facet in a second region adjacent to an opposite sidewall of the cavity, and the etching step may also remove the second region to thereby remove the second facet and produce a second channel between the opposite sidewall and the stack; the filling step may also fill the second channel with amorphous silicon or SiGe.

The method may further include the step of lining the cavity with a spacer prior to growing the stack. The spacer may be between 5 nm and 35 nm in thickness, and may be 20 nm in thickness. The method may further include the step of etching away a part of the lining which is in a bed of the cavity i.e. between the sidewalls of the cavity).

The electro-optically active device may be any one of: an electro-optic modulator, a photodetector, or a laser. In some embodiments the device is an electro-optic modulator and in some embodiments it is a quantum-confined Stark effect based electro-absorption modulator.

The electro-optically active stack may comprise a multiple quantum well region.

The epitaxially grown stack may include a silicon layer and a buffer layer, and the method may include adjusting the height of the buffer layer such that an optical mode of the modulator matches an optical mode of the SOI waveguide. The silicon layer may be a lowermost layer of the epitaxially grown stack i.e. the layer closest to the bed of the cavity.

In some embodiments, the stack is ordered as follows going up from a layer immediately adjacent to a silicon substrate: a layer of silicon that has the same thickness of the BOX layer, a buffer layer comprising SiGe, a P doped layer comprising SiGe, a spacer layer comprising SiGe, a quantum well multiple quantum well layer comprising Ge/SiGe, a further spacer layer comprising SiGe, an N doped layer comprising SiGe, an N doped layer comprising SiGe, and an N+ doped layer comprising SiGe.

In some embodiments, the stack is ordered as follows going up from a layer immediately adjacent to a silicon substrate: a layer of SiGe that has the same thickness of the BOX layer, a P doped buffer layer comprising SiGe, a spacer layer comprising SiGe, a quantum well multiple quantum well layer comprising Ge/SiGe, a further spacer layer comprising SiGe, an N doped layer comprising SiGe, and an N+ doped layer comprising SiGe.

In some embodiments, the stack is ordered as follows going up from a layer immediately adjacent to a silicon substrate: a layer of silicon that has the same thickness of the BOX layer, a P doped buffer layer comprising SiGe, a spacer layer comprising SiGe, a quantum well multiple quantum well layer comprising Ge/SiGe, a further spacer layer comprising SiGe, an N doped layer comprising SiGe, and an N+ doped layer comprising SiGe.

More particularly, in some embodiments, the stack is ordered as follows going up from a layer immediately adjacent to the silicon substrate: a 400 nm silicon layer, a 400 nm buffer layer comprising $Si_{0.28}Ge_{0.72}$, a 200 nm P doped layer comprising $Si_{0.28}Ge_{0.72}$, a 50 nm (or 20 nm) spacer layer comprising $Si_{0.28}Ge_{0.72}$, 7 (or 10) quantum wells with each of the well comprising a 10 nm Ge well layer and a 12 nm $Si_{0.43}Ge_{0.57}$ barrier layer, a further 50 nm (or 20 nm) spacer layer comprising $Si_{0.28}Ge_{0.72}$, a 600 nm N doped layer comprising $Si_{0.28}Ge_{0.72}$, a 200 nm N doped layer comprising $Si_{0.8}Ge_{0.2}$, and a 100 nm N+ doped layer comprising $Si_{0.8}Ge_{0.2}$. The top 100 nm N+ doped is in some embodiments heavily doped (with a doping of more than $1\times10^{19}$ cm$^{-3}$, for example) to realise an ohmic contact with low contact resistance. The 400 nm buffer can also be P doped to reduce the series resistance and to obtain high speed.

In some embodiments, the stack is ordered as follows going up from a layer immediately adjacent to the silicon substrate: a 400 nm $Si_{0.8}Ge_{0.2}$ layer (which may be referred to as a transit buffer layer), a 400 nm P doped layer comprising $Si_{0.18}Ge_{0.82}$ (which may be referred to as a buffer layer), a 15 nm (or 50 nm) spacer layer comprising $Si_{0.18}Ge_{0.82}$, 8 quantum wells with each well comprising a 10 nm Ge well layer and a 12 nm $Si_{0.33}Ge_{0.67}$ barrier layer, a further 15 nm (or 50 nm) spacer layer comprising $Si_{0.18}Ge_{0.82}$, a 300 nm N doped layer comprising $Si_{0.18}Ge_{0.82}$, and a 80 nm N+ doped layer comprising $Si_{0.8}Ge_{0.2}$. The top 80 nm N+ doped is in some embodiments heavily doped (with a doping of more than $1\times10^{19}$ cm$^{-3}$, for example) to realise an ohmic contact with low contact resistance. The dopant species in the N doped layer and N+ doped layer may be phosphorus.

In some embodiments, the stack is ordered as follows going up from a layer immediately adjacent to the silicon substrate: a 400 nm Si layer (which may be referred to as a transit buffer layer), a 400 nm P doped layer comprising $Si_{0.18}Ge_{0.82}$ (which may be referred to as a buffer layer), a 15 nm (or 50 nm) spacer layer comprising $Si_{0.18}Ge_{0.82}$, 8 quantum wells with each well comprising a 10 nm Ge well layer and 12 nm $Si_{0.33}Ge_{0.67}$ barrier layer, a further 15 nm (or 50 nm) spacer layer comprising $Si_{0.18}Ge_{0.82}$, a 300 nm N doped layer comprising $Si_{0.18}Ge_{0.82}$, and a 80 nm N+ doped layer comprising $Si_{0.18}Ge_{0.82}$. The top 80 nm N+ doped is in some embodiments heavily doped (with a doping of more than $1 \times 10^{19}$ $cm^{-3}$, for example) to realise an ohmic contact with low contact resistance. The dopant species in the N doped layer and N+ doped layer may be phosphorus.

In a further aspect, the invention provides a silicon based electro-optically active device comprising:

a silicon-on-insulator (SOI) waveguide;

an electro-optically active waveguide including an electro-optically active stack within a cavity of the SOI waveguide; and a channel between the electro-optically active stack and the SOI waveguide; wherein the channel is filled with a filling material with a refractive index similar to that of a material forming a sidewall of the cavity to thereby form a bridge-waveguide in the channel between the SOI waveguide and the electro-optically active stack.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES

Figure 1:
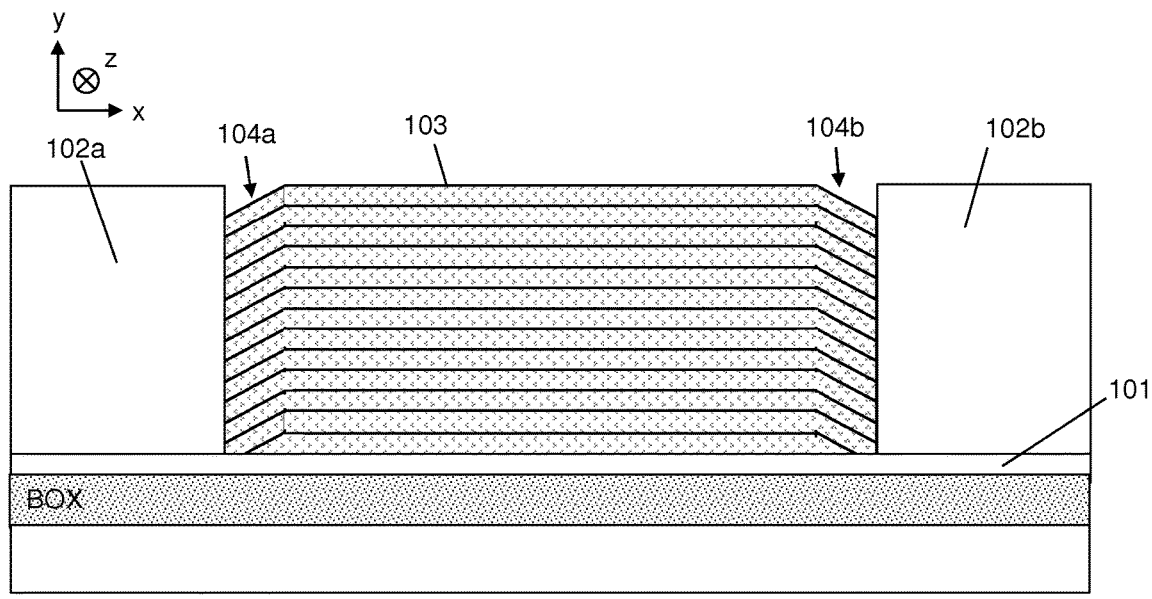
FIG. 1 shows a device according to the prior art.
Figure 2A:
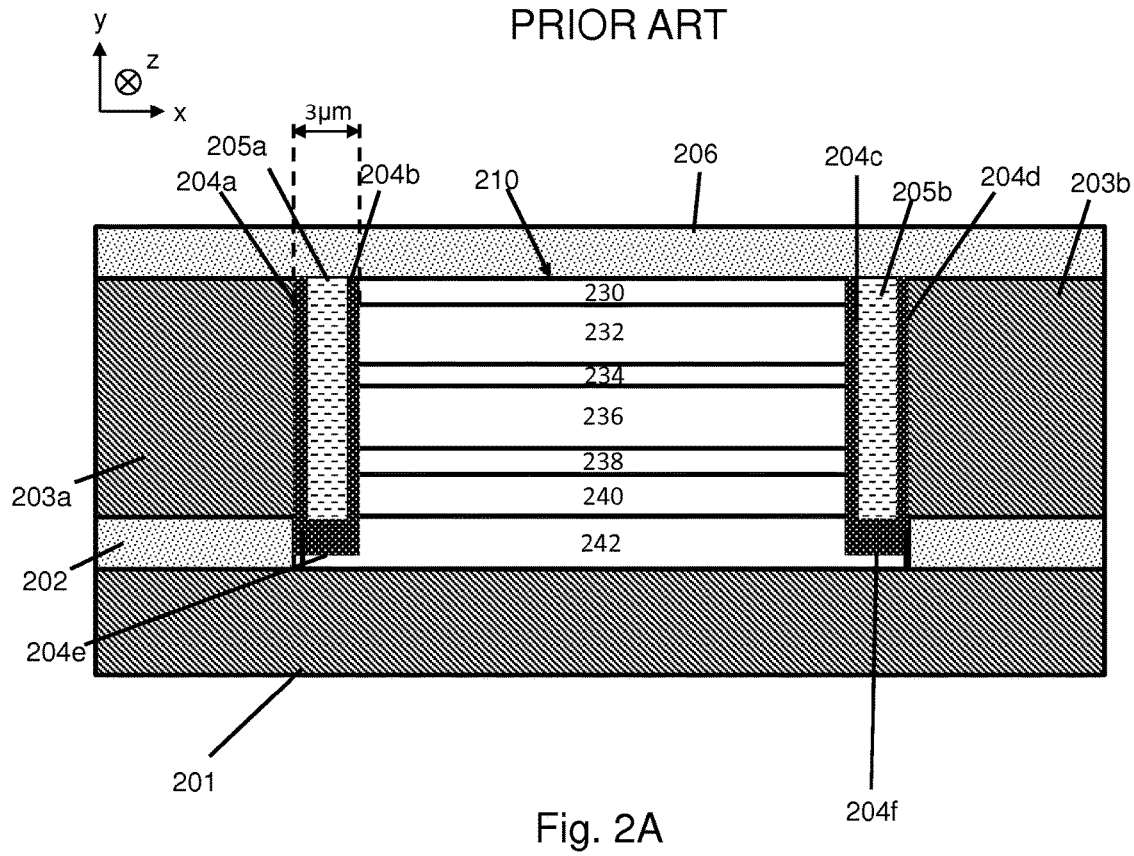
FIGS. 2A-2D show various cross-sections of the device shown in FIG. 2.
Figure 2:
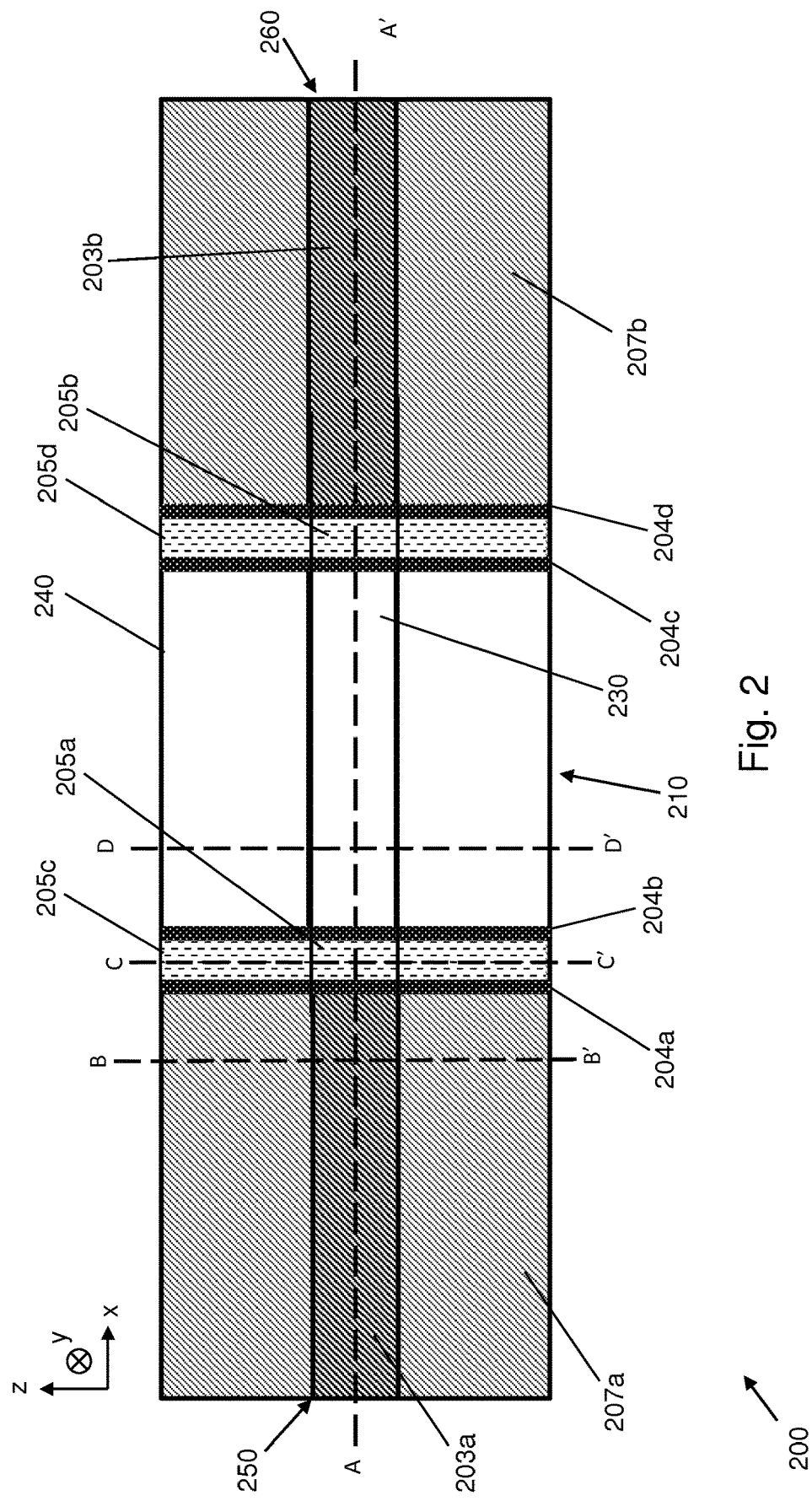
FIG. 2 shows a top-down perspective view of a device according to the present invention.
Figure 2B:
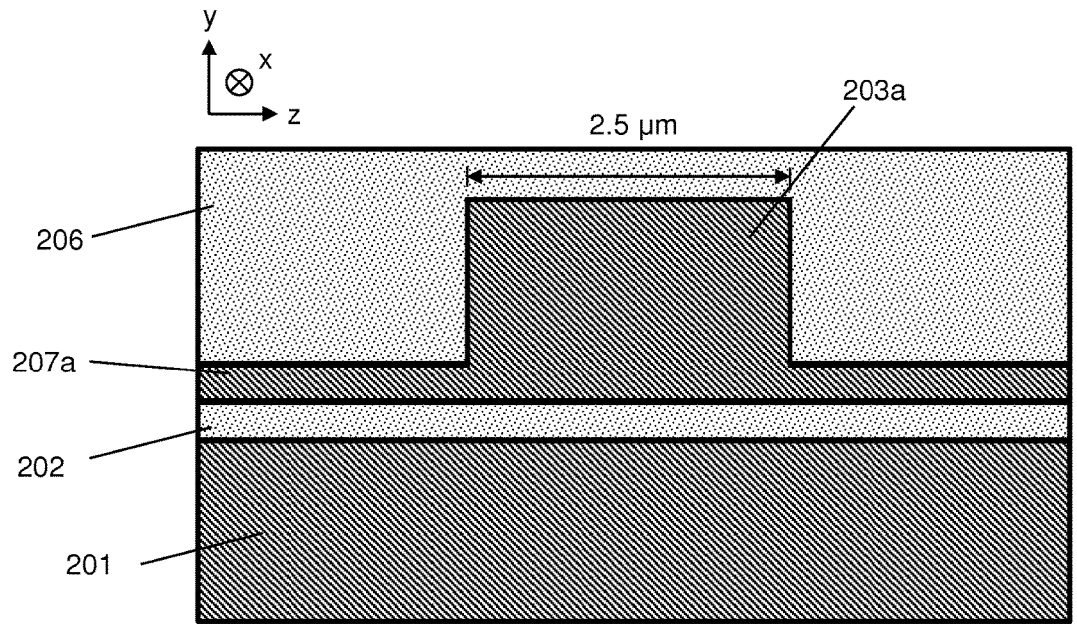
Figure 2C:
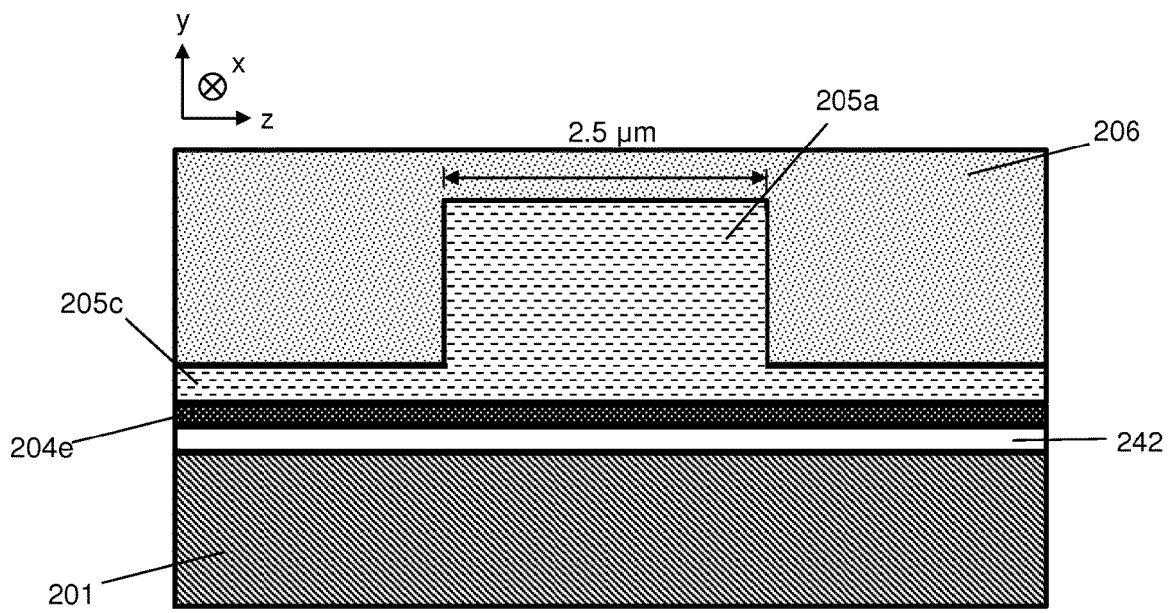
Figure 2D:
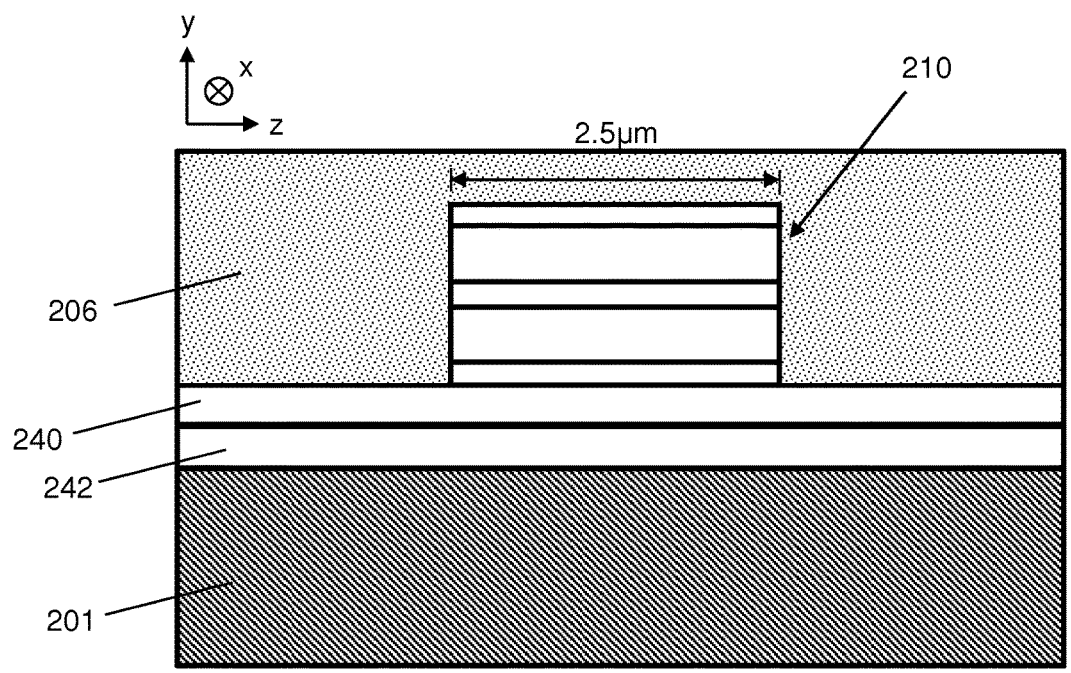

FIG. 2 shows a device 200 according to the present invention. FIG. 2A shows a cross-sectional view of the device along the line A-A', FIG. 2B shows a cross-sectional view of the device along the line B-B', FIG. 2C shows a cross-sectional view of the device along the line C-C', and FIG. 2D shows a cross-sectional view of the device along the line D-D'.

Broadly, the device comprises a waveguide formed of a rib disposed on top of a slab which extends from one end of the device to the other, in the x direction indicated in the figure. The entire device resides on a silicon substrate 201, which in places is covered with a buried oxide layer 202. The buried oxide layer may be around 400 nm thick, as measured from an uppermost surface of the silicon substrate in the y direction.

Light enters the device via an input port of input waveguide 250. The input waveguide 250 comprises a rib portion 203a which is on top of a slab portion 207a. In this example, both are formed from silicon. Light in the waveguide is guided in direction x i.e. into the plane of FIG. 2B. As is most clearly shown in FIG. 2B, the rib portion 203a has a width, as measured in the y direction, of around 2.5 µm. The rib may have a thickness, measured in the y direction from an uppermost part of the slab portion, of around 0.6 µm. The slab may have a thickness, measured in the y direction from an uppermost part of the buried oxide layer, of around 0.4 µm. The input waveguide sits on top of the buried oxide layer 202 which is, in turn, on top of the silicon substrate 201. The optical mode of the input waveguide is such that the majority of the light is contained within the rib portion 203a, with a minor portion of the light being contained with the slab portion 207a.

Light is guided by the input waveguide 250 from an input port to an output port which is adjacent to a channel. The channel comprises: a first sidewall liner 204a, a filling material 205, and a second sidewall liner 204b. A cross-sectional view of the channel, along the line C-C', is shown in FIG. 2C. As can be seen, the filling material comprises a rib portion 205a and a slab portion 205c. The dimensions of the filling material substantively match the dimensions of the input waveguide where the input waveguide provides the output port. Beneath the filling material is a first bottom liner 204e, a second bottom liner is located in a second channel located on an opposite side of the device as discussed below. The first and second bottom liners may have a thickness of around 400 nm. The first sidewall liner, the second sidewall liner, and the first bottom liner are all formed of silicon nitride (SiN), for example $Si_3N_4$. The length of the channel in the x direction is around 3 µm. Below the first bottom liner 204e is a layer 242, which forms a part of the optically active stack discussed below.

The light passes through the channel, which acts as a bridge-waveguide, and enters an optically active stack 210. The stack may have a length, as measured in the x direction and from one channel to the next, of around 80 µm. The stack in this example comprises, from a bottom most layer to an uppermost layer (in a direction away from silicon substrate 201):

242: 400 nm tall transit buffer layer formed of $Si_{0.8}Ge_{0.2}$;

240: 400 nm tall P type buffer layer formed of $Si_{0.18}Ge_{0.82}$;

238: 15 nm tall spacer layer formed of $Si_{0.18}Ge_{0.82}$;

236: 188 nm tall multiple quantum well layer, which comprises 8 Ge quantum wells each 10 nm tall with a 12 nm barrier layer between each, the barrier being formed of $Si_{0.33}Ge_{0.67}$, there may be 9 barrier layers;

234: 15 nm tall spacer layer formed of $Si_{0.18}Ge_{0.82}$;

232: 300 nm tall N layer formed of $Si_{0.18}Ge_{0.82}$ doped to a concentration of $1 \times 10^{18}$ $cm^{-3}$; and 230: 80 nm tall N+ layer formed of $Si_{0.8}Ge_{0.82}$ doped to a concentration of $>1 \times 10^{19}$ $cm^{-3}$.

The dopant species in the N and N+ layers may be phosphorus. Such a stack can provide a quantum-confined Start effect with a peak $\Delta\alpha/alpha$ of 0.95 at a 1310 nm operating wavelength at 60° C. with 2V bias. The absorption coefficient ($cm^{-1}$) at 1310 nm of the multiple quantum well layer may be 320. The multiple quantum well layer may have a refractive index at 1310 nm of around 4.0531. In contrast, the refractive index of the α-silicon fill may be around 3.4.

The optically active stack may be an electro-optically active stack. For example, the optically active stack may be operable as a quantum confined Stark effect modulator.

Detailed parameters of one example are shown in Table 1 below:

TABLE 1

| Layer # | Name | Thickness (nm) | Composition | Doping type | Doping concentration (cm^3) | index real (n)@1310 nm | index image (k) @1310 nm | absorption coeffictient (cm−1) @1310 nm |
|---|---|---|---|---|---|---|---|---|
| 230 | N-layer | 80 | Si0.8Ge0.2 | N, phosphorus | >1E19 | 3.6041 | 0.00001 | 1 |
| 232 | N-layer | 300 | Si0.18Ge0.82 | N, phosphorus | 1.00E+18 | 4.0313 | 0.00083 | 80 |
| 234 | spacer | 15 | Si0.18Ge0.82 | uid | | 4.0313 | 0.00063 | 60 |
| 236 | Barrier | 12 | Si0.33Ge0.67 | uid | | 4.0531 | 0.00334 | 320 |
| 236 | QW | 10 | Ge | uid | | | | |
| 236 | Barrier | 12 | Si0.33Ge0.67 | uid | | | | |
| 236 | QW | 10 | Ge | uid | | | | |
| 236 | Barrier | 12 | Si0.33Ge0.67 | uid | | | | |
| 236 | QW | 10 | Ge | uid | | | | |
| 236 | Barrier | 12 | Si0 33Ge0.67 | uid | | | | |
| 236 | QW | 10 | Ge | uid | | | | |
| 236 | Barrier | 12 | Si0.33Ge0.67 | uid | | | | |
| 236 | QW | 10 | Ge | uid | | | | |
| 236 | Barrier | 12 | Si0.33Ge0.67 | uid | | | | |
| 236 | QW | 10 | Ge | uid | | | | |
| 236 | Barrier | 12 | Si0.33Ge0.67 | uid | | | | |
| 236 | QW | 10 | Ge | uid | | | | |
| 236 | Barrier | 12 | Si0.33Ge0.67 | uid | | | | |
| 238 | spacer | 15 | Si0.18Ge0.82 | uid | | 4.0313 | 0.00063 | 60 |
| 240 | Buffer layer | 400 | Si0.18Ge0.82 | P, Boron | 1.00E+18 | 4.0313 | 0.00073 | 70 |
| 242 | Transit buffer | 400 | Si0.8Ge0.2 | uid | | 3.6041 | 0.00000 | 0 |
| Si-sub | Si substrate | — | Si | | | 3.5111 | 0.00000 | 0 |
| | MQW@0 V | | | | | 4.0531 | 0.00334 | 320 |
| | MQW@2 V | | | | | 4.0531 | 0.00650 | 624 |

The transit buffer layer 242 extends at least part of the way under the channel, as shown most clearly in FIG. 2A. Moreover, both the transit buffer layer 242 and the P type buffer layer extend in the z direction further than the other layers so as to provide a slab to the optically active region as shown most clearly in FIG. 2D. The optically active stack 210 therefore provides a waveguide, including a rib portion formed of layers 238-230 and a slab portion formed of layers 240 and 242. A width of the rib portion, as shown in FIG. 2D, is around 2.5 μm.

In some examples the optically active stack is connected to one or more electrodes, and may be operated as a modulator e.g. an electro-absorption modulator.

After passing through the optically active stack 210, the light passes through a second channel which is formed of a third sidewall liner 204c, a second filling materially 205b and 205d, and a fourth sidewall liner 204d. The structure of the second channel is substantively identical to the first.

After passing through the second channel, the light enters output waveguide 260 which comprises a rib portion 203b on top of a slab portion 207b. The light may then exit the device via an output port in the output waveguide. The output waveguide is generally similar to the input waveguide, and conceptually the device can be considered bi-directional (in that the input waveguide could be the output waveguide and vice versa).

Shown in FIGS. 2A-2D, but not in FIG. 2, is upper insulating layer 206. This upper insulating layer is formed, for example, from silicon dioxide ($SiO_2$) and can function to passivate the device. It is omitted from FIG. 2 for clarity.

Figure 3A:
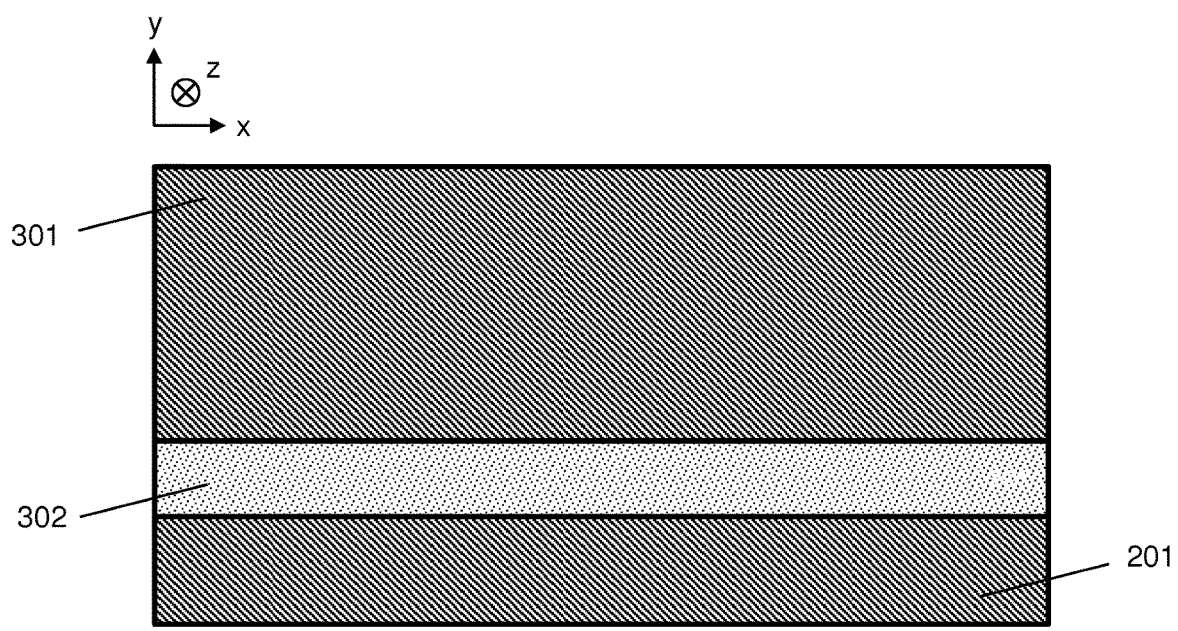
FIGS. 3(A)-3(Q)A show various manufacturing steps according to the present invention.
Figure 3B:
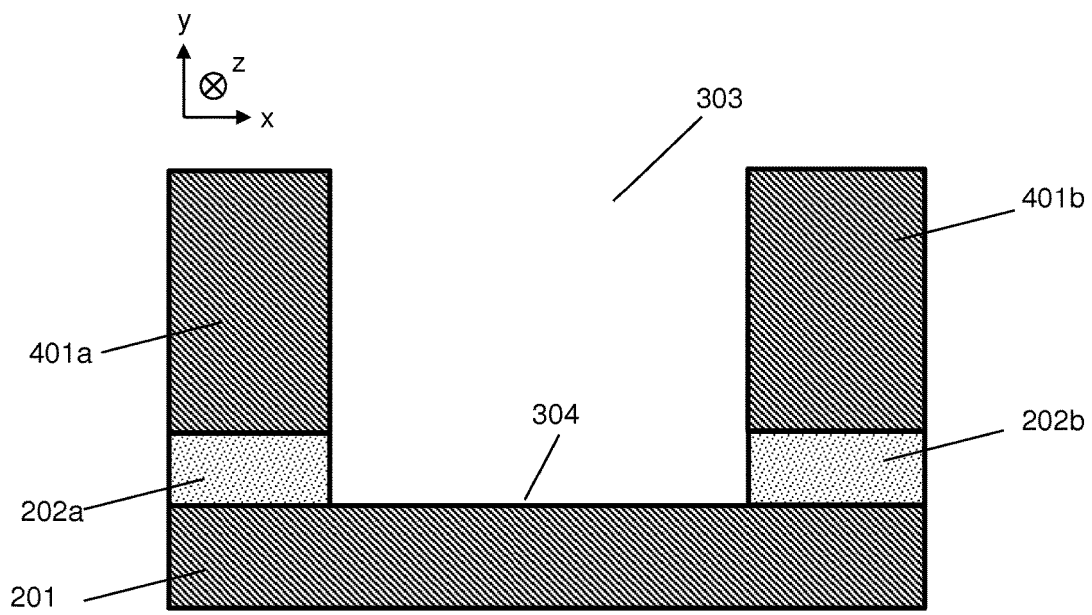
Figure 3C:
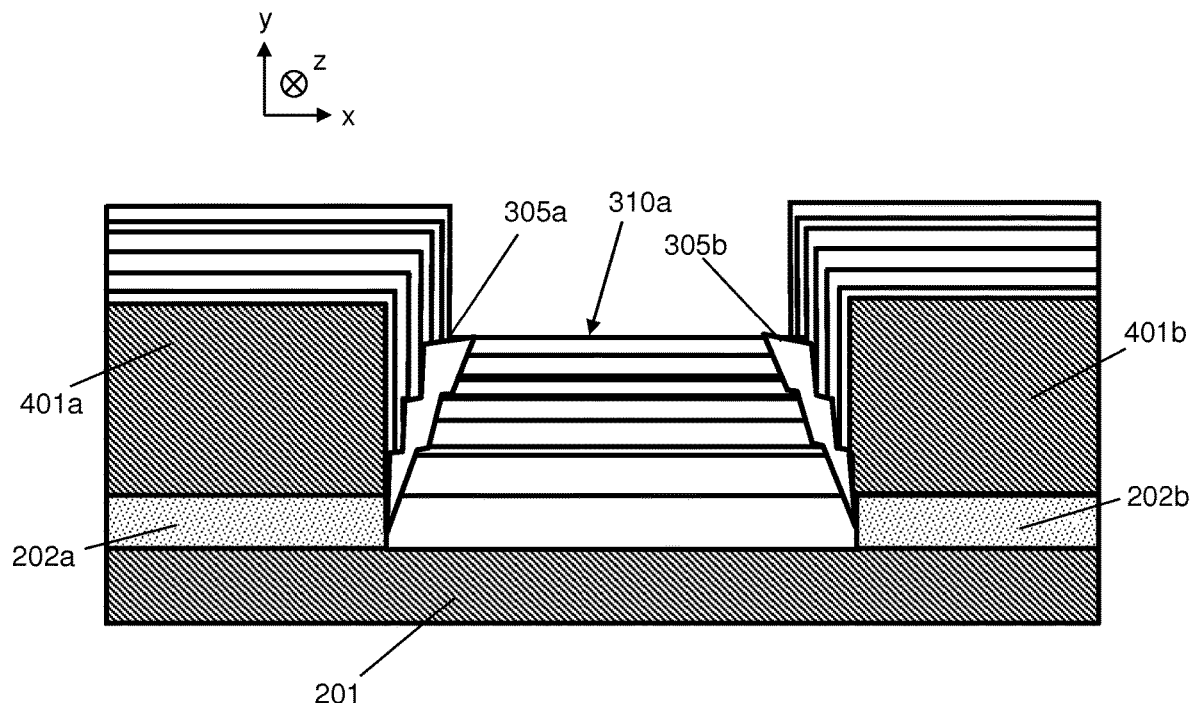
Figure 3D:
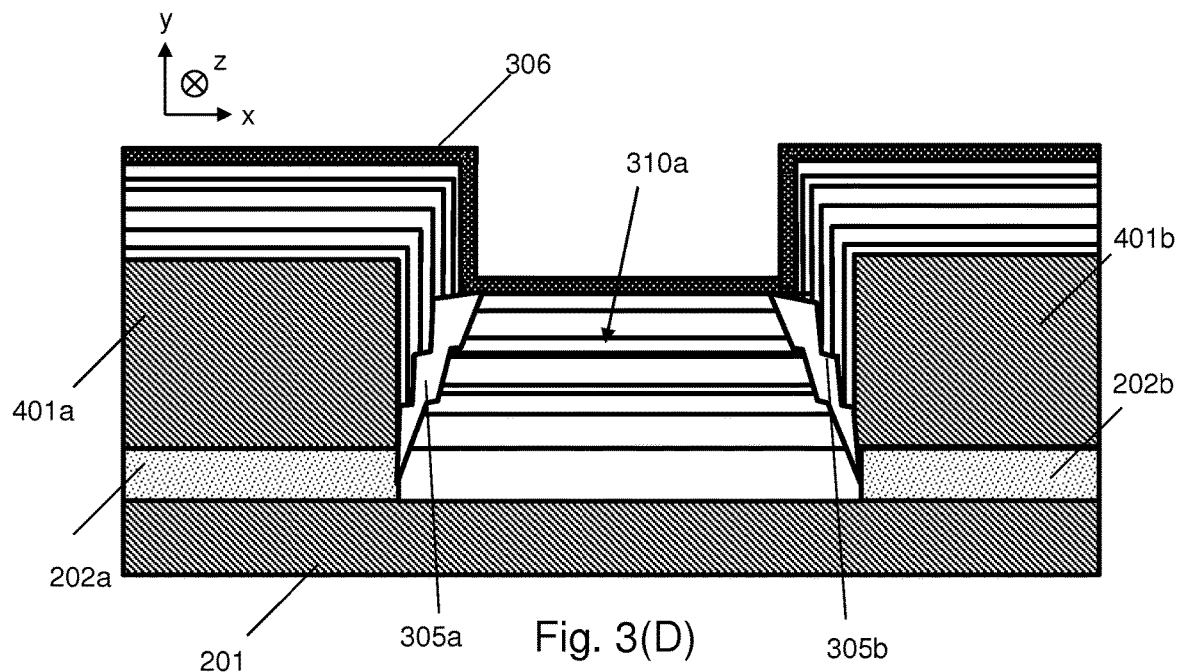
Figure 3E:
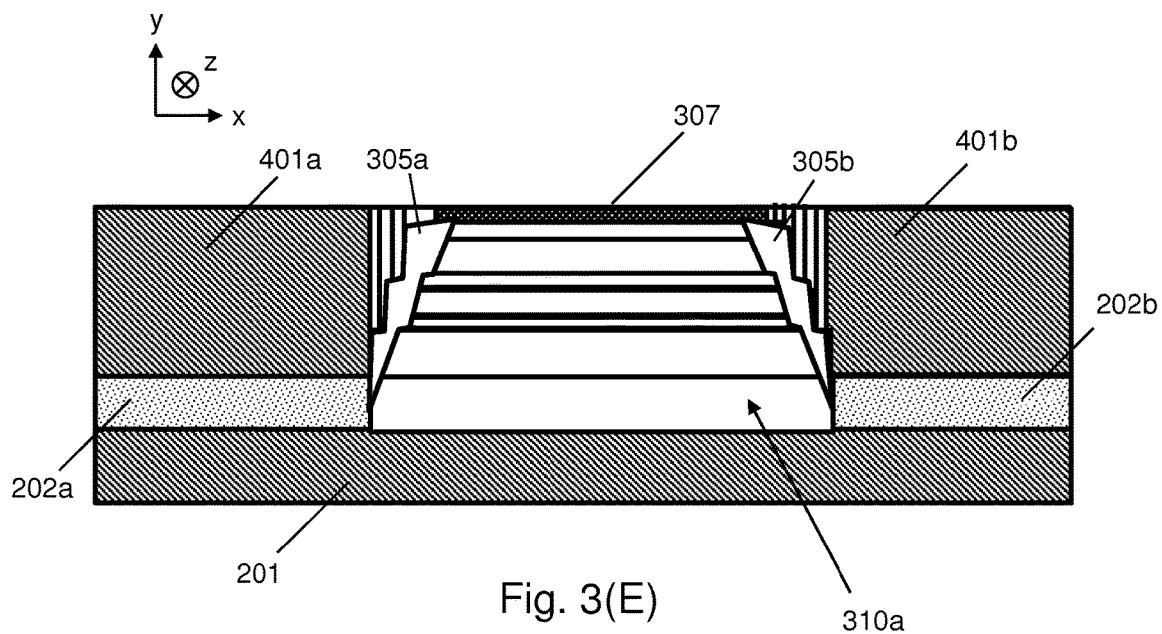
Figure 3F:
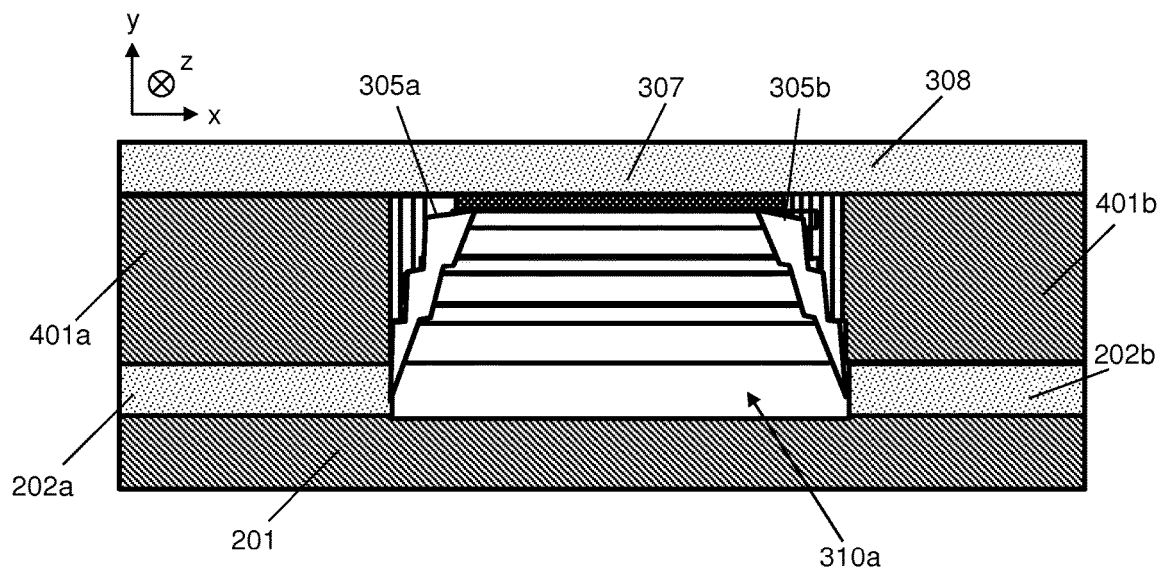
Figure 3G:
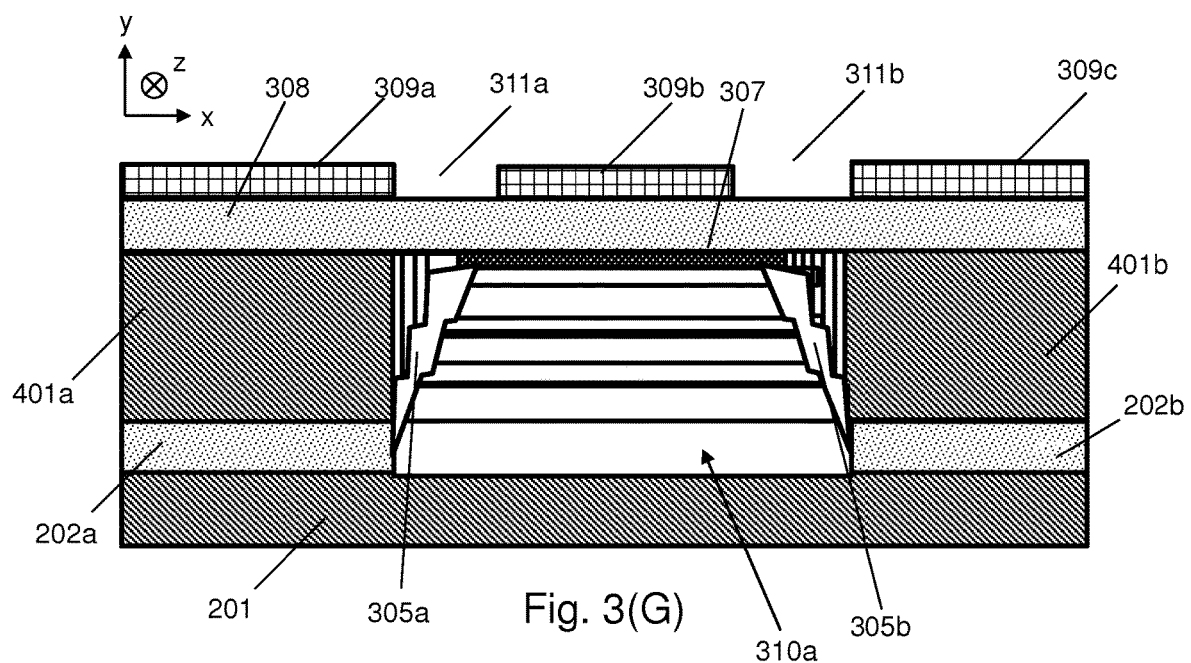
Figure 3H:
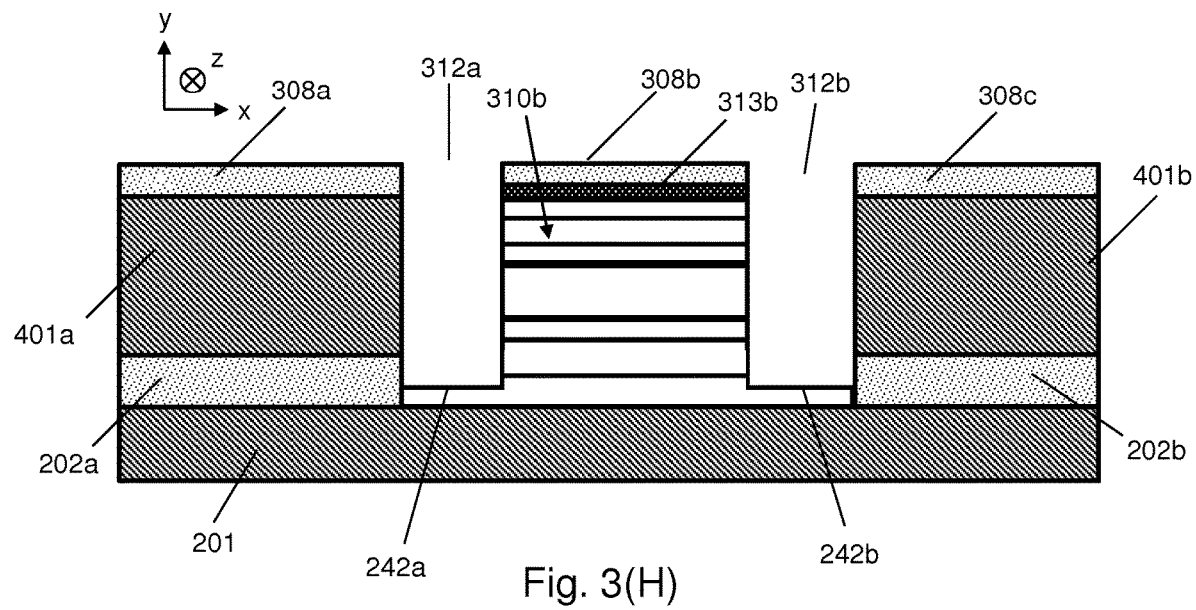
Figure 3H:
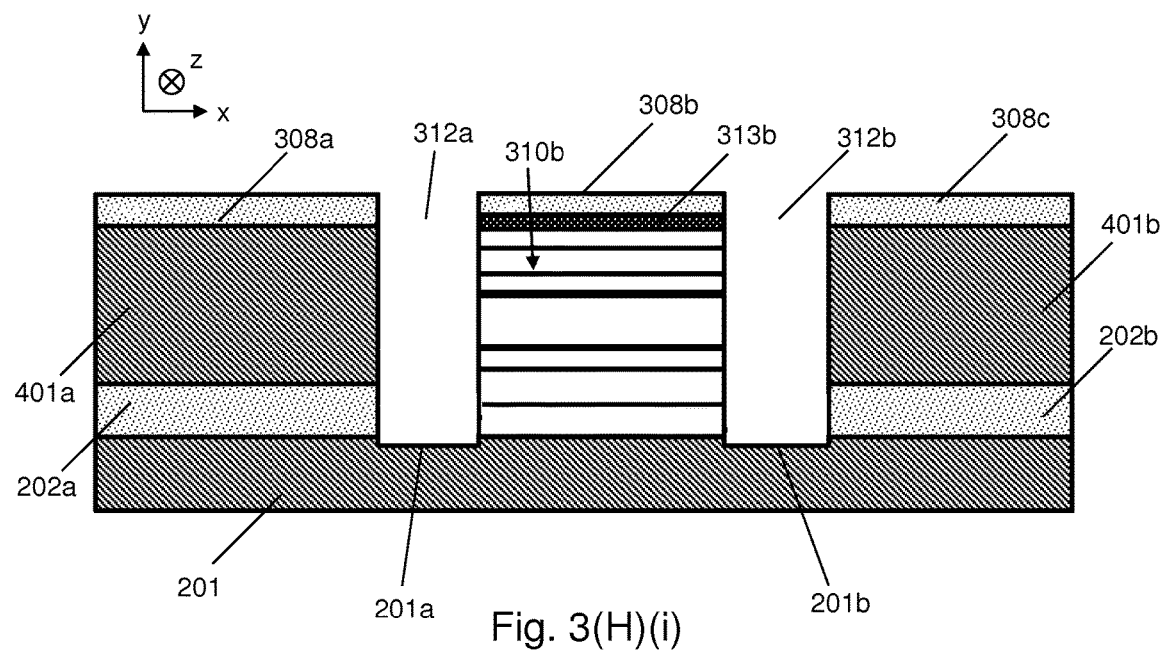
Figure 3I:
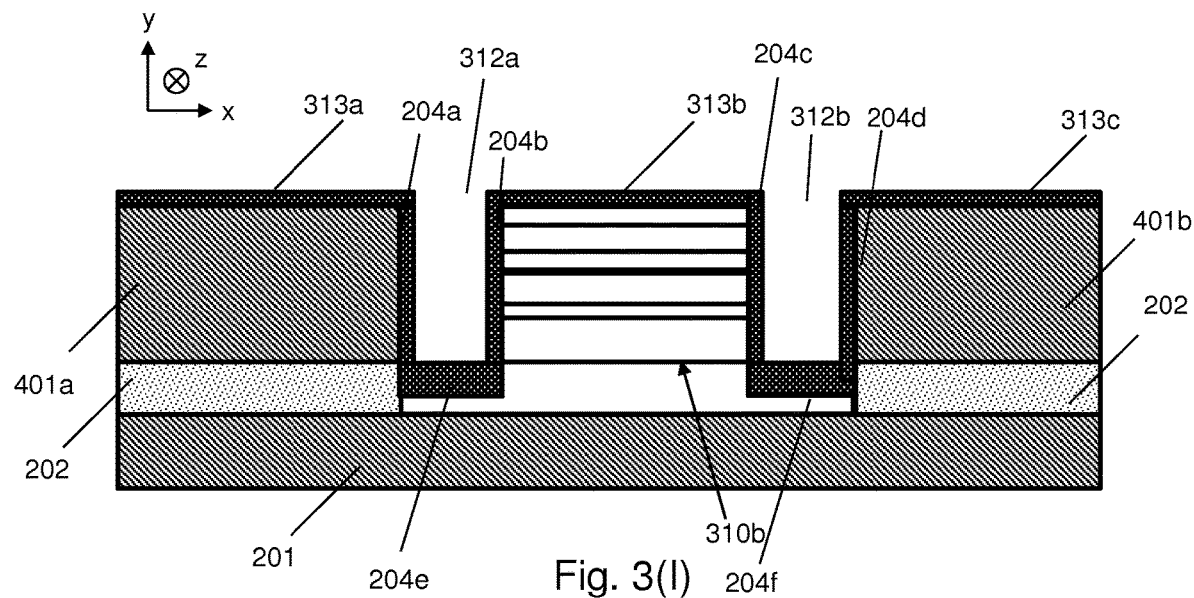
Figure 3J:
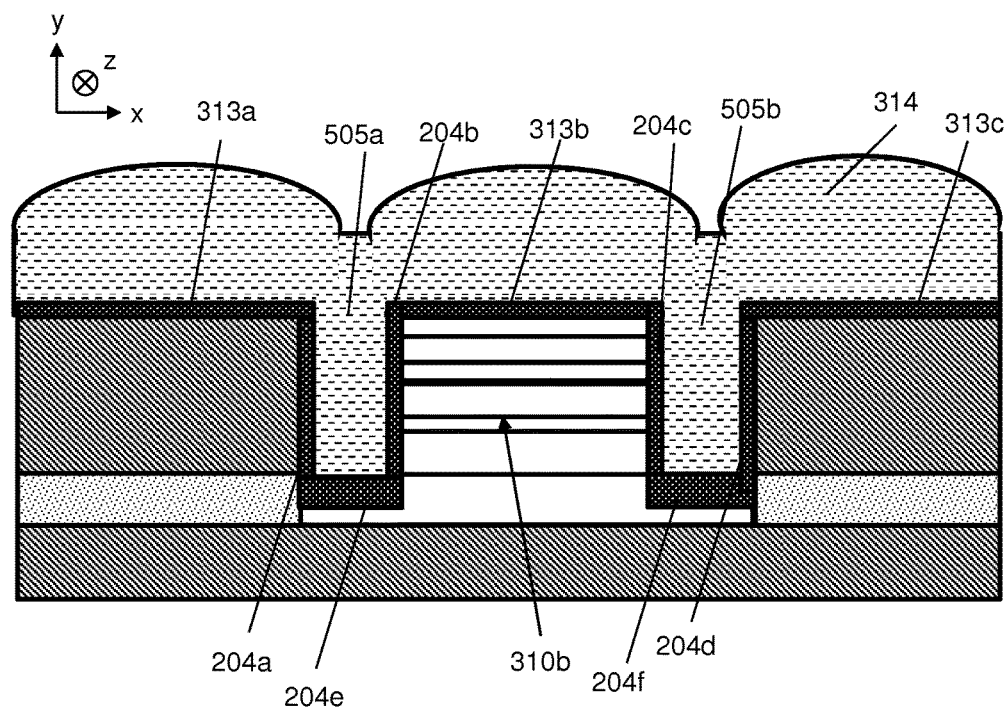
Figure 3K:
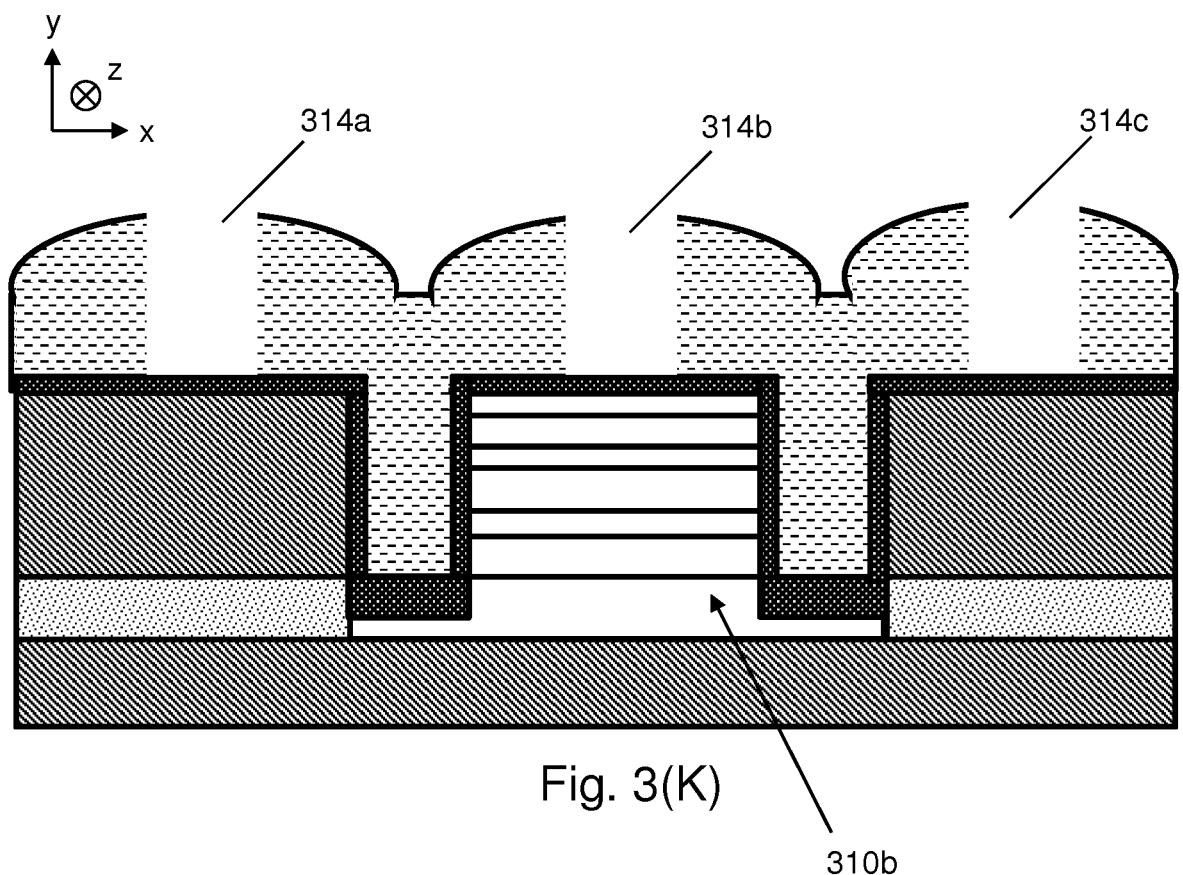
Figure 3L:
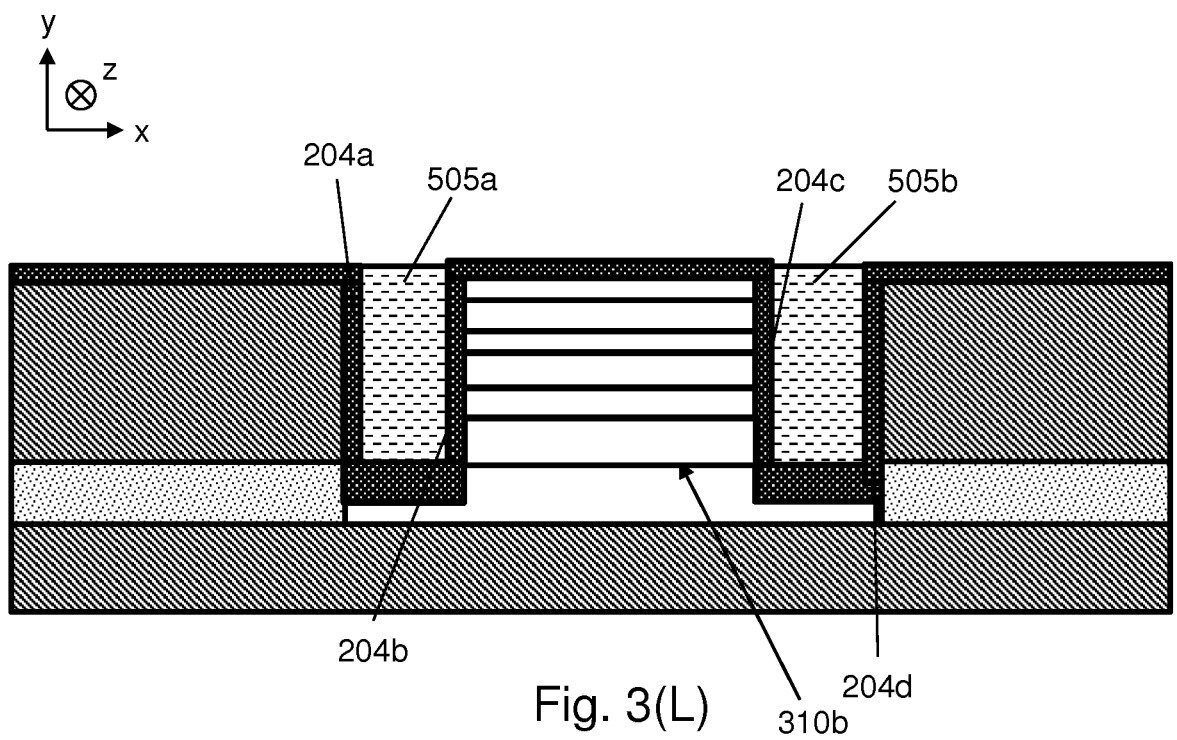
Figure 3M:
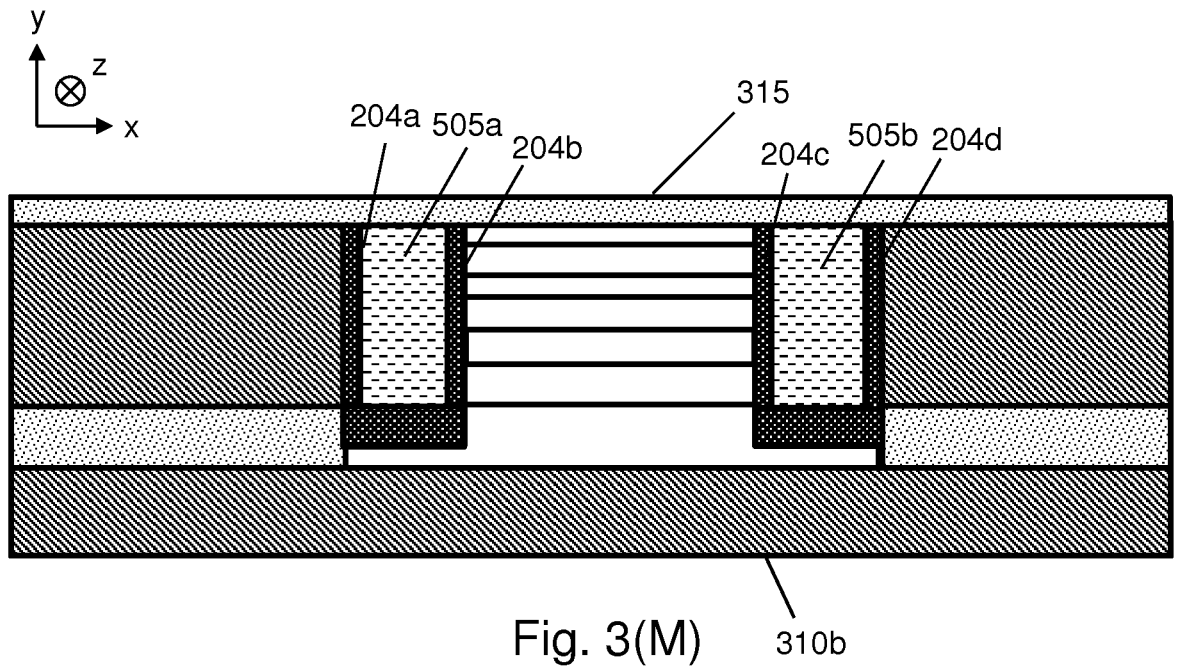
Figure 3N:
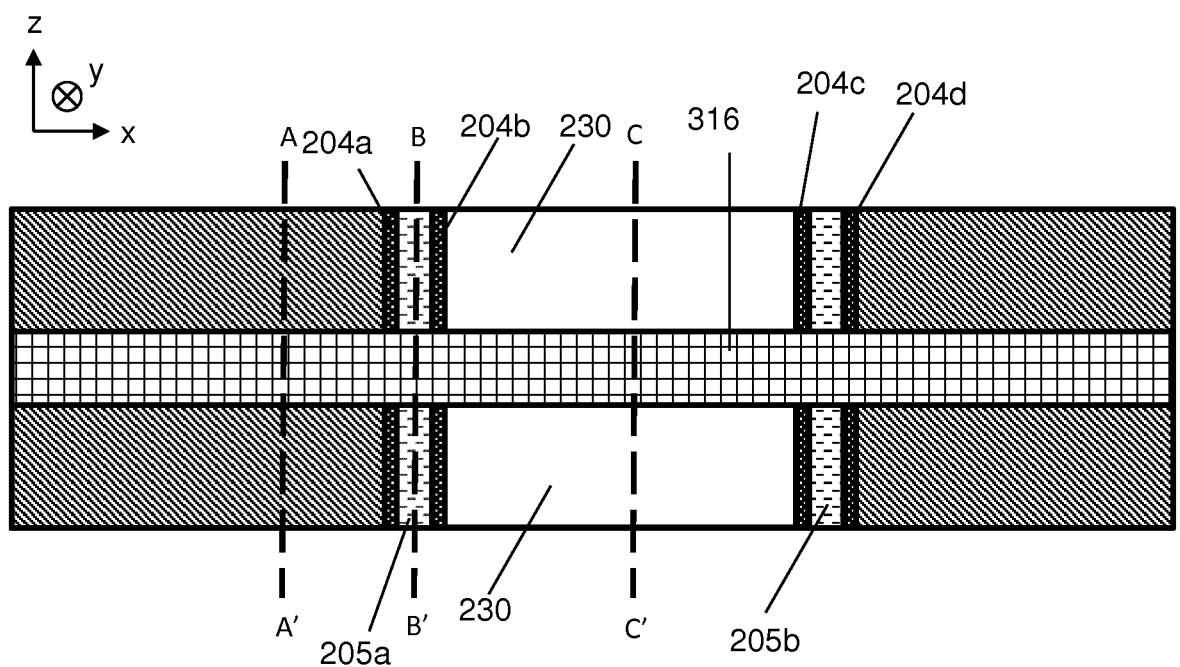

FIGS. 3(A)-3(N) show various manufacturing steps along the same A-A' plane as FIG. 2A. FIG. 3(A) shows a first manufacturing step according to the present invention. A silicon-on-insulator wafer is provided, which comprises a silicon substrate 201, on top of which is a buried oxide (e.g. $Si)_2$) layer 302. On top of the buried oxide layer is a silicon layer 301, which may be around 1.1 μm-1.5 μm tall (as measured in the y direction from an upper surface of the buried oxide layer to an upper surface of the silicon layer).

Next, as shown in FIG. 3(B), a cavity 303 is etched into the device. The cavity extends to an upper surface 304 of the silicon substrate 201 and includes removal of at least a portion of the buried oxide layer, resulting in first 202a and second 202b buried oxide layers located either side of the cavity. Similarly, a portion of the silicon layer is removed and so first 401a and second 401b silicon portions are provided either side of the cavity 303.

Next, as shown in FIG. 3(C), a first precursor optically active stack 310a is epitaxially deposited onto the now etched silicon-on-insulator wafer. The epitaxial deposition occurs in n stages, where n corresponds to the number of layers in the precursor optically active stack. However, during deposition the precursor optically active stack epitaxially grows from all exposed surfaces. Therefore, not only is there the desirable growth from the upper surface 304 of the silicon substrate, but also from the side walls of the first 401a and second 401b silicon portions and also from the upper surface of these silicon portions. Therefore, facet defects 305a and 305b result which can cause significant signal loss if left in the device. These faceted regions can be understood as resulting from a curvature in each of the layers of the precursor optically active stack.

Subsequent to the step shown in FIG. 3(C), a silicon nitride layer 306 is deposited over the uppermost surface of the first precursor optically active stack 310a. This is shown in FIG. 3D. The silicon nitride layer may be formed of $Si_3N_4$.

Next, as shown in FIG. 3(E), the device undergoes a chemical-mechanical planarization process. This removes the portions of the first precursor optically active stack 310a which extend above the cavity formed previously as well as a part of each of the silicon portions 401a and 401b. Around 20 nm of the silicon nitride layer 307 is retained. The planarization process and/or a subsequent etching process are performed so that the height of the first 401*a* and second 401*b* silicon portions is around 1 μm.

As a next step, a silicon dioxide hard mask 308 is deposited over the upper surface of the device. The result of this is shown in FIG. 3(F).

Subsequently, as shown in FIG. 3(G), photoresists 309*a*, 309*b*, and 309*c* are provided over the upper surface of the device. Gaps 311*a* and 311*b* are provided in the photoresists above the facet defect regions 305*a* and 305*b*. Seen from a top-down view, the photoresist would be as a single layer with two rectangular gaps above the respective facet defect regions. This photoresist may be provided by depositing a single layer of photoresist, and then removing the material necessary to form the rectangular gaps e.g. via e-beam r optical photolithography.

FIG. 3(H) shows the result of a subsequent step, where the areas not covered by the photoresist have been etched and the photoresist then removed. The depth of this etching step is variable. In the example shown in FIG. 3(H), the etching removes around 240 nm of the 400 nm transit buffer, leaving first 242*a* and second 242*b* regions of the transit buffer which have a reduced thickness relative to the remaining transit buffer 242. In an alternative, shown in FIG. 3(H)(i) the etching removes all of the transit buffer not covered by the photoresist and may etch into the silicon substrate 201. The result in this example is a first 201*a* and second 201*b* exposed region of the silicon substrate. The etching also provides a first channel 312*a* and second channel 312*b* which bound two surfaces of the precursor optically active stack. In general, the etching depth depends on the thickness of the silicon nitride liner on the bottom of the channel in the next process step, to ensure the top surface of the silicon nitride liner is aligned with the top surface of the BOX layer.

The first precursor optically active stack 310*a* and is now a second precursor optically active stack 310*b*, which is distinguished from the first by no longer including the facet defect regions 305*a* and 305*b*.

After this etching step, the silicon dioxide hard mask 308 is removed and a 240 nm thick silicon nitride (e.g. $Si_3N_4$) sidewall is deposited on all exposed surfaces of the device. This is shown in FIG. 3(I), and provides a first 313*a*, second 313*b*, and third 313*c* upper liner (which will be removed) and also the sidewall liners 204*a*-204*d* as well as the first and second bottom liners 204*e* and 204*f*, whose top surfaces are aligned with the top surface of the BOX layer, as shown in FIG. 2A.

Next, as shown in FIG. 3(J), amorphous silicon (also referred to as α-Si) is deposited to fill the remainder of the first 312*a* and second 312*b* channels. First 505*a* and second 505*b* bulk filling materials are provided, which will provide the filling material shown in FIG. 2A. However there is substantial amounts of bulk amorphous silicon not contained within the channels 312*a* and 312*b*, which should be removed.

Therefore, as shown in FIG. 3(K) openings 314*a*-314*c* are etched into the amorphous silicon which is not present in the channels 312*a* and 312*b*. These openings increase the degree of uniformity obtained during a subsequent chemical-mechanical planarization (CMP) process the result of which is shown in FIG. 3(L). The CMP process is performed so that the upper liner portions 313*a*-313*c* are reduced to around 20 nm and the remaining amorphous silicon is substantively aligned with the upper liner portions 313*a*-313*c*.

Next, as shown in FIG. 3(M), a further etching step is performed to bring an uppermost surface of the amorphous silicon into line with an uppermost surface of the second pre-precursor optically active stack. Moreover the upper liner portions 313*a*-313*c* are removed, and so an uppermost surface 230 of the second pre-cursor optically active stack 310*b* is exposed. After this, a second hard mask 315 is deposited over the uppermost surface.

FIG. 3(N) shows a subsequent step from a top-down perspective, omitting the second hard mask 315 for clarity. A second photoresist 316 is provided over a central portion of the uppermost surface of the device, extending from one side to the other. The width of the second photoresist (measured in the z direction) defines the width of the resulting rib portion of the input waveguide, output waveguide, and optically active stack. FIGS. 3(N)A-3(N)C show, respectively, cross-sectional views along the lines A-A', B-B', and C-C' in FIG. 3(N).

The uncovered portions are then etched, and the result is shown in FIGS. 3(O)A-3(O)C. In FIG. 3(O)A, taken along the cross-section A-A' of FIG. 3(N) after etching has been performed, shows the input waveguide now comprises the rib portion 203*a* and slab portion 207*a* shown in FIG. 2B. Similarly, FIG. 3(O)B, taken along the cross-section B-B' of FIG. 3(N) after etching has been performed, shows the filling material now includes a rib portion 205*b* as well as slab portion 205*c* which is above the first bottom liner 204*e*. Further, FIG. 3(O)C, taken along the cross-section C-C' of FIG. 3(N) after etching has been performed, shows that the second precursor optically active stack has become the optically active stack 210 shown in FIG. 2D.

To provide the device shown in FIGS. 2-2D, the photoresist 316 is removed and bulk silicon dioxide provided to passivate the device.

Further, optional, steps are shown in FIGS. 3(P)-3(Q)A, where one or more electrodes are connected to respective layers of the optically active stack.

FIG. 3(P) shows the result of a further etching step, where one side of the optically active stack 210 is etched to remove a portion of the P type buffer layer 240, so that an upper surface of the transit buffer 242 is exposed. This is most clearly shown in FIG. 3(P)(A) which is a cross-section view of FIG. 3(P) taken along the lines C-C'. The view along cross-sections A-A' and B-B' remains substantively unchanged.

Further to this, as shown in FIG. 3(Q) a first 601 and second 602 electrode as provided. As most clearly seen in FIG. 3(Q)A, a cross-section along the lines C-C' of FIG. 3(Q), the first electrode 601 extends from a position adjacent to the optically active stack (but separated from the transit buffer layer 242 by upper insulating layer 206), up a sidewall of the optically active stack and through a via in the upper insulating layer 206 so as to form an electrical contact with N+ layer 230. Similarly, second electrode 602 extends through a second via in the upper insulting layer 206 to form an electrical contact with the P type buffer layer 240.

When connected to electrodes, the device may be drivable with a voltage of between 0 and 2 V. Optical losses of devices according to the present invention are detailed in Table 2 below:

TABLE 2

| Driving Voltage (V) | Active Length (um) | Active Loss (dB) | Si/a-Si Waveguide Mode Mismatch Loss (dB) | a-Si/SiGe MQW Waveguide Mode Mismatch Loss (dB) | Interface Coupling Loss(dB) | Total Loss (dB) | Peak Δα/α wavelength (nm) |
|---|---|---|---|---|---|---|---|
| 0-2 | 80 | 5.654 | 0.052 | 0.229 | 0.110 | 6.044 | 1310 |
| 1-3 | 105 | 6.217 | 0.052 | 0.229 | 0.110 | 6.608 | 1330 |

Various dimensions are illustrated on the figures, and should be taken as indications rather than definitive values.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

The invention claimed is:

1. A silicon based electro-optically active device comprising:
   a silicon-on-insulator (SOI) waveguide;
   an electro-optically active waveguide including an electro-optically active stack within a cavity of the SOI waveguide; and
   a lined channel between the electro-optically active stack and the SOI waveguide, the lined channel comprising a liner,
   wherein the lined channel is filled with a filling material with a refractive index similar to that of a material forming a sidewall of the cavity, to thereby form a bridge-waveguide in the lined channel between the SOI waveguide and the electro-optically active stack, and
   wherein the liner comprises a first sidewall between the SOI waveguide and the filling material, the first sidewall comprising a material different from a material of the SOI waveguide.

2. The silicon based electro-optically active device of claim 1, wherein the liner is formed of silicon nitride.

3. The silicon based electro-optically active device of claim 1, wherein a lowest surface of sidewalls of the lined channel and a top surface of a portion of the liner located in a base of the lined channel are aligned with a top surface of a buried oxide layer of the SOI waveguide.

4. The silicon based electro-optically active device of claim 1, wherein the liner has a thickness of at least 200 nm no more than 280 nm.

5. The silicon based electro-optically active device of claim 1, wherein the electro-optically active stack includes a multiple quantum well region.

6. The silicon based electro-optically active device of claim 1, wherein the filling material is amorphous silicon.

7. The silicon based electro-optically active device of claim 1, wherein the filling material is silicon-germanium (SiGe).

8. The silicon based electro-optically active device of claim 1, wherein the electro-optically active stack has a parallelogramal or trapezoidal geometry.

9. The silicon based electro-optically active device of claim 1, further comprising an epitaxial cladding layer located in-between a silicon substrate of the SOI waveguide and the electro-optically active stack which forms the electro-optically active waveguide, the epitaxial cladding layer having a refractive index less than that of a buffer layer in the electro-optically active stack.

10. The silicon based electro-optically active device of claim 9, wherein an epitaxial material of the epitaxial cladding layer is silicon.

11. The silicon based electro-optically active device of claim 9, wherein an epitaxial material of the epitaxial cladding layer is silicon-germanium (SiGe).

12. A method of producing the silicon based electro-optically active device of claim 1, the method having the steps of:
    providing the silicon-on-insulator (SOI) waveguide;
    etching the cavity in the SOI waveguide through a BOX layer of the SOI waveguide;
    epitaxially growing the electro-optically active stack within the cavity, and etching the electro-optically active stack to form the electro-optically active waveguide, wherein the epitaxially grown electro-optically active stack has a facet in a region adjacent to the sidewall of the cavity;
    etching the region to thereby remove the facet and produce a channel between the sidewall and the electro-optically active stack;
    lining the channel with the liner to provide the lined channel; and
    filling the lined channel with the filling material which has the refractive index similar to that of the material forming the sidewall so that the filling material forms the bridge-waveguide in the channel between the SOI waveguide and the electro-optically active stack.

13. The method of claim 12, wherein the liner is formed of silicon nitride.

14. The method of claim 12, wherein the liner has a thickness of at least 200 nm no more than 280 nm.

15. The method of claim 12, wherein the electro-optically active stack includes a multiple quantum well region.

16. The method of claim 12, wherein the filling material that the lined channel is filled with comprises amorphous silicon.

17. The method of claim 12, wherein the filling material that the lined channel is filled with comprises silicon-germanium (SiGe).

18. The method of claim 12, wherein the step of filling the lined channel is carried out by plasma-enhanced chemical vapour deposition.

19. The method of claim 12, wherein the step of filling the lined channel is carried out by hot-wire chemical vapour deposition.

20. The method of claim 12, further including a step of planarizing the filling material through chemical-mechanical polishing.

21. The method of claim 12, wherein:
    the electro-optically active stack has a second facet in a second region adjacent to an opposite sidewall of the cavity,
    the step of etching the region also removes the second region to thereby remove the second facet and produce a second channel between the opposite sidewall and the electro-optically active stack, and the step of filling the lined channel also fills the second channel with amorphous silicon.

22. The method of claim 21, wherein the silicon based electro-optically active device is a quantum-confined Stark effect based electro-absorption modulator.

23. The method of claim 22, wherein the electro-optically active stack includes a buffer layer, and the method includes adjusting a height of the buffer layer such that an optical mode in the modulator matches an optical mode in the SOI waveguide.

24. The method of claim 12, wherein the electro-optically active stack is grown such that it has a parallelogramal or trapezoidal geometry in the cavity.

25. The method of claim 12, wherein the step of etching a cavity in a part of the SOI waveguide includes the step of etching the SOI waveguide up to or beyond a base of its buried oxide (BOX) layer to create a box-less region.

26. The method of claim 25, further comprising the step of growing a cladding layer within the cavity, the cladding layer having a refractive index which is less than the refractive index of a buffer layer of the electro-optically active stack.

27. A silicon based electro-optically active device comprising:
   a silicon-on-insulator (SOI) waveguide;
   an electro-optically active waveguide including an electro-optically active stack within a cavity of the SOI waveguide; and
   a lined channel between the electro-optically active stack and the SOI waveguide, the lined channel comprising a liner,
   wherein the lined channel is filled with a filling material with a refractive index similar to that of a material forming a sidewall of the cavity, to thereby form a bridge-waveguide in the lined channel between the SOI waveguide and the electro-optically active stack, and
   wherein the liner comprises a first sidewall between the SOI waveguide and the filling material, the first sidewall comprising a material different from the filling material.

* * * * *